United States Patent
Wang et al.

(10) Patent No.: US 9,519,398 B2
(45) Date of Patent: *Dec. 13, 2016

(54) SEARCH IN A NATURE INSPIRED USER INTERFACE

(71) Applicant: SAP SE, Walldorf (DE)

(72) Inventors: Xiao Wang, Mountain View, CA (US); Bingjun Zhou, Mountain View, CA (US); Philipp Maximilian Wesel, Ettlingen (DE); Vishal Sikka, Los Altos, CA (US); Sanjay Rajagopalan, Palo Alto, CA (US); Janaki Kumar, Palo Alto, CA (US); Tao Liu, Sunnyvale, CA (US); Jun Zhu, Mountain View, CA (US)

(73) Assignee: SAP SE, Walldorf (DE)

( * ) Notice: Subject to any disclaimer, the term of this patent is extended or adjusted under 35 U.S.C. 154(b) by 215 days.

This patent is subject to a terminal disclaimer.

(21) Appl. No.: 14/108,020

(22) Filed: Dec. 16, 2013

(65) Prior Publication Data

US 2015/0169178 A1 Jun. 18, 2015

(51) Int. Cl.
| G06F 3/0481 | (2013.01) |
| G06F 17/30 | (2006.01) |
| G06F 3/0486 | (2013.01) |
| G06F 3/0488 | (2013.01) |
| G06Q 10/06 | (2012.01) |

(52) U.S. Cl.
CPC ......... *G06F 3/04817* (2013.01); *G06F 3/0486* (2013.01); *G06F 3/04883* (2013.01); *G06F 17/30* (2013.01); *G06Q 10/06393* (2013.01)

(58) Field of Classification Search
CPC .................................................. G06F 3/04817
USPC ........................................................ 715/765
See application file for complete search history.

(56) References Cited

U.S. PATENT DOCUMENTS

| 5,394,521 A | 2/1995 | Henderson |
| 5,886,698 A * | 3/1999 | Sciammarella ....... G06F 3/0486 |
| | | 707/999.005 |
| 6,211,876 B1 * | 4/2001 | Ackermann ...... G06F 17/30675 |
| | | 704/239 |
| 6,237,006 B1 | 5/2001 | Weinberg |
| 6,639,614 B1 | 10/2003 | Kosslyn |
| 6,792,595 B1 | 9/2004 | Storistenau |
| 6,842,176 B2 | 1/2005 | Sang'udi et al. |
| 7,774,745 B2 | 8/2010 | Fildebrandt et al. |
| 7,831,582 B1 | 11/2010 | Scofield et al. |
| 7,840,935 B2 | 11/2010 | Fildebrandt et al. |

(Continued)

OTHER PUBLICATIONS iPhoneDownloadBlog, "Using Spotlight Search on the iPhone", available at <https://www.youtube.com/watch?v=lz1G3LDSt0Q>, avaialbe on Jan. 3, 2011, 5 pages.*

*Primary Examiner* — Reza Nabi
*Assistant Examiner* — Daniel Rodriguez
(74) *Attorney, Agent, or Firm* — Fountainhead Law Group P.C.

(57) ABSTRACT

Techniques are described for interacting with a nature inspired virtual environment to present information to the user. The information can be presented to the user by using a collection of icons in the virtual environment. The virtual environment and the collection of icons can resemble a scene from nature. As a result, the additional information is presented to the user without disrupting the visual appearance of the nature inspired virtual environment.

20 Claims, 19 Drawing Sheets

(56) References Cited

U.S. PATENT DOCUMENTS

| | | |
|---|---|---|
| 8,150,101 B2 | 4/2012 | Haanpaa et al. |
| 8,161,087 B2 | 4/2012 | Latzina |
| 8,196,047 B2 | 6/2012 | Fisher et al. |
| 8,312,039 B2 | 11/2012 | Gilula |
| 8,489,569 B2 | 7/2013 | Kirk et al. |
| 8,502,823 B2 | 8/2013 | Moreno |
| 8,533,619 B2 | 9/2013 | Baier et al. |
| 8,612,806 B2 | 12/2013 | Rossi |
| 8,935,245 B1* | 1/2015 | Cionca .............. G06F 17/30554 707/732 |
| 8,972,879 B2 | 3/2015 | Migos |
| 2001/0034742 A1* | 10/2001 | Stinson ................. G06F 3/0481 715/202 |
| 2002/0033848 A1* | 3/2002 | Sciammarella ....... G06F 3/0481 715/838 |
| 2002/0174121 A1 | 11/2002 | Clemie |
| 2006/0101347 A1* | 5/2006 | Runov .............. G06F 17/30067 715/764 |
| 2007/0011146 A1* | 1/2007 | Holbrook ........... G06Q 30/0603 |
| 2007/0288498 A1* | 12/2007 | Dietz ................ G06F 17/30864 |
| 2008/0092121 A1 | 4/2008 | DeRose |
| 2008/0098332 A1 | 4/2008 | LaFrance-Linden |
| 2009/0094197 A1* | 4/2009 | Fein .................... G06F 17/3005 |
| 2009/0158196 A1* | 6/2009 | Crystal ............. G06F 17/30572 715/780 |
| 2010/0037203 A1* | 2/2010 | Limburn ................... G06F 8/33 717/105 |
| 2010/0049566 A1 | 2/2010 | Fukuoka |
| 2010/0149132 A1* | 6/2010 | Iwase .................... G06F 1/1626 345/175 |
| 2010/0299201 A1* | 11/2010 | Thrasher ........... G06F 17/30648 705/14.49 |
| 2011/0138340 A1 | 6/2011 | Holm-Petersen et al. |
| 2011/0173264 A1 | 7/2011 | Kelly |
| 2011/0196864 A1* | 8/2011 | Mason ................... G06F 3/0416 707/728 |
| 2011/0202853 A1 | 8/2011 | Mujkic |
| 2012/0047130 A1 | 2/2012 | Perez et al. |
| 2012/0096390 A1 | 4/2012 | Kwahk |
| 2012/0174011 A1* | 7/2012 | Cabrera-Cordon ... G06F 3/0488 715/769 |
| 2012/0192048 A1* | 7/2012 | Suzuki ................... G06Q 30/00 715/205 |
| 2012/0209878 A1* | 8/2012 | Park .................... G06F 3/04817 707/771 |
| 2012/0290950 A1 | 11/2012 | Rapaport |
| 2012/0290977 A1* | 11/2012 | Devecka ............... H04W 4/206 715/810 |
| 2013/0019193 A1 | 1/2013 | Rhee |
| 2013/0024760 A1 | 1/2013 | Vogel et al. |
| 2013/0167082 A1 | 6/2013 | Joo |
| 2013/0167088 A1 | 6/2013 | Mangum |
| 2013/0212526 A1 | 8/2013 | Park et al. |
| 2013/0232263 A1 | 9/2013 | Kelly |
| 2013/0247030 A1 | 9/2013 | Kay |
| 2013/0247044 A1* | 9/2013 | Bingham ............. G06F 9/45533 718/1 |
| 2013/0297588 A1 | 11/2013 | Tyagi |
| 2014/0080600 A1 | 3/2014 | Knutsson |
| 2014/0089090 A1* | 3/2014 | Thrasher ........... G06F 17/30864 705/14.54 |
| 2014/0143695 A1 | 5/2014 | Sundermeyer |
| 2014/0280056 A1* | 9/2014 | Kelly ................ G06F 17/30554 707/722 |
| 2014/0320500 A1* | 10/2014 | Fletcher .................... G09G 5/36 345/440 |
| 2014/0320502 A1* | 10/2014 | Fletcher ................ G06T 11/206 345/440.2 |
| 2014/0325058 A1* | 10/2014 | Fletcher ................ H04L 43/045 709/224 |
| 2014/0325363 A1* | 10/2014 | Fletcher ............. G06F 9/45533 715/736 |
| 2014/0380214 A1* | 12/2014 | Huang ................... G06F 3/0486 715/769 |
| 2015/0058796 A1 | 2/2015 | Beckett |
| 2015/0089366 A1 | 3/2015 | Migos |

\* cited by examiner

SEARCH IN A NATURE INSPIRED USER INTERFACE

BACKGROUND

In the digital age, business executives have access to a plethora of business data that they did not have in the past. This business data is analyzed to create key performance indicators (KPIs) which provide valuable insight on the performance of various parts of the company. Business executives often monitor these KPIs throughout the day and draw valuable insights from these KPIs to make critical business decisions. Exemplary KPIs include the number of defects in every 100 items or customer satisfaction.

While this business data is a valuable resource to business executives, the amount of information available can be overwhelming. It can be difficult to monitor this constant flow of changing data. Management information systems have been created to provide a snapshot of the businesses performance however these systems typically have shortcomings. First of all, the snapshots provided are often so densely populated with data that it can be difficult to extract insightful conclusions from them. Moreover, the user interface associated with these systems are typically tailored for a specific demographic and thus do not translate well across different cultures. As a result, some users spend a large amount of time learning and understanding the user interface.

SUMMARY

In one embodiment, a computer-implemented method provides, by a processor, a virtual environment having a visual appearance corresponding to a scene from nature. The method then provides, by the processor, a first collection of icons within the virtual environment that represent the collection of data, the first collection of icons including a plurality of icons that represent a plurality of performance metrics derived from the collection of data and a group icon, wherein the plurality of icons cluster around the group icon.

In one example, the method can continue by receiving, by the processor, a first input representative of selecting an icon from the plurality of icons and displaying, by the processor, information associated with a performance metric corresponding to the selected icon in response to the first input. Displaying the information can include converging, by the processor, a second collection of icons scattered around the virtual environment at a predefined area in the virtual environment, moving, by the processor, icons other than the second collection of icons outside the predefined area in the virtual environment, and arranging, by the processor, the second collection of icons to form a chart or graph that presents the information associated with the performance metric. In some examples, the method can also provide, by the processor, a spotlight on the selected icon and dim, by the processor, the remainder of the virtual environment.

In another example, the method can continue by providing, by the processor, a second collection of icons scattered around the virtual environment. The method then receives, by the processor, a first input representative of initiating a search feature. The method continues by moving, by the processor, the first collection of icons towards at least one edge of the virtual environment until the first collection of icons are no longer on the virtual environment in response to the first input. The method then displays, by the processor, a search bar. In some examples, the method can further receive, by the processor, a second input representative of a search parameter. The method then performs, by the processor, a search based on the search parameter to return a plurality of search results. The method then assigns, by the processor, each of the plurality of search results to an icon from the second collection of icons. The method then converges, by the processor, the second collection of icons towards the search bar, wherein the proximity of an icon from the second collection of icons to the search bar is dependent on the relevance of the corresponding search result to the search parameter. In one example, the visual appearance of the icon is dependent on the relevance of the corresponding search result to a user account.

In another embodiment, a non-transitory computer readable storage medium stores one or more programs comprising instructions providing a virtual environment having a visual appearance corresponding to a scene from nature and providing a first collection of icons within the virtual environment that represent the collection of data, the first collection of icons including a plurality of icons that represent a plurality of performance metrics derived from the collection of data and a group icon, wherein the plurality of icons cluster around the group icon.

In another embodiment, a computer implemented system comprises one or more computer processors and a non-transitory computer-readable storage medium. The non-transitory computer-readable storage medium comprises instructions, that when executed, control the one or more computer processors to be configured for providing a virtual environment having a visual appearance corresponding to a scene from nature and providing a first collection of icons within the virtual environment that represent the collection of data, the first collection of icons including a plurality of icons that represent a plurality of performance metrics derived from the collection of data and a group icon, wherein the plurality of icons cluster around the group icon.

The following detailed description and accompanying drawings provide a better understanding of the nature and advantages of the present disclosure.

DETAILED DESCRIPTION

Figure 1:
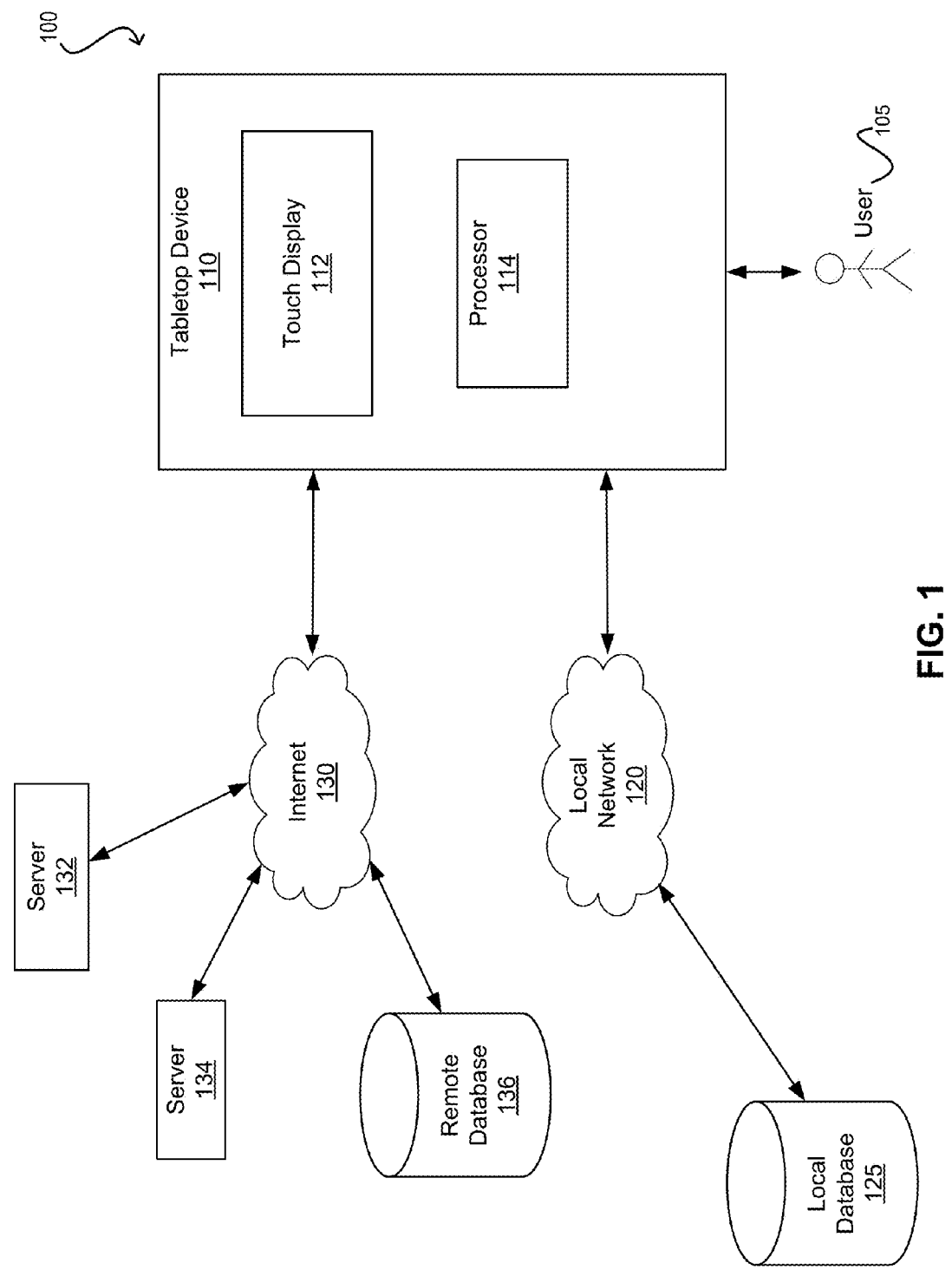
FIG. 1 illustrates a system according to one embodiment.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various embodiments described herein provide a graphical user interface for viewing business data associated with an organization. A touch display can present business data for consumption by the user. In some examples, the touch display can be part of an electronic device, such as a tabletop device. A tabletop device is an electronic device with a touch display in a horizontal orientation similar to a tabletop. A user looks down at the tabletop device to view performance metrics used for evaluating the business data. The electronic device can receive user inputs in the form of touch gestures on the touch display to control the graphical representation of the business data. In some examples, other types of data besides business data can be graphically presented but for purposes of simplicity, the examples and embodiments here will be directed towards business data.

Business data can be presented visually as part of a virtual environment corresponding to a scene from nature. Nature elements in the nature scene can represent business data. Since nature scenes are often found to be peaceful, the graphical presentation of business data as part of a nature scene can be both informative and also soothing, appealing, and/or interesting to the viewer. Moreover, nature elements are universally understood and have a timeless appeal since they appear substantially the same throughout space and time. For instance, a healthy 1960's water lily from the United States appears substantially the same as a healthy 2010's water lily from Europe. Similarly, a chicken from South America appears substantially the same as a chicken from Asia. This timeless quality that is inherently present in elements from nature allows the virtual environment to be easily understood by users from diverse cultures and demographics while also transcending time. In some examples, the business data can belong to an enterprise environment.

Through the user interface, requests for data visualization of business data and search queries on business data can be received and processed. The data visualization and search queries can be presented on the touch display by using elements of nature in the virtual environment. By using elements of nature, the data visualization and search results are presented in a manner that is both visually pleasing and easy to comprehend. The following description will begin with a section discussing a nature inspired virtual environment followed by a section discussing data visualization and search queries in the virtual environment.

The Virtual Environment

FIG. 1 illustrates system 100 according to one embodiment. System 100 includes tabletop device 110 however in other embodiments, tabletop device 110 can be any electronic device that is configured to graphically present data for consumption by user 105. This can include desktop computers, laptops, and handheld electronic devices. Tabletop device 110 includes touch display 112 and processor 114. Processor 114 is configured to process business data and generate a virtual environment to be displayed on touch display 112. In some embodiments, a dedicated data processor can process business data while a graphics processor generates the virtual environment in which the business data is graphically presented in. In some examples, touch display 112 can be a traditional display and user inputs can be received from some other types of user interface. For instance, peripheral devices such as a mouse or a touchpad can be used.

Tabletop device 110 can be configured to communicate with local network 120 to access business data in local database 125. The local business data can include private business data describing the performance of the organization. For example, the private business data can include attrition data, survey data, sales data, profits data, company news, and business expenses data. Private business data can have privacy considerations and thus is stored in the local network. Processor 114 can retrieve the local business data or performance metrics such as key performance indicators (KPIs) from the private business data. KPIs provide a simple way to evaluate the success of parts of the organization. The KPIs can be derived from the private business data or can be retrieved. In one example, user 105 can draw insights from KPIs and make important business decisions based on the insights.

Tabletop device 110 is also configured to communicate with internet 130 to access remote data from server 132, server 134, or remote database 136. Remote data can include business data that is publically available or provided by third party sources. For example, remote data can include news, stock market quotes, and search query results. Processor 114 can retrieve remote data from these remote sources. In one example, the remote data is search results. The search results can be presented in the virtual environment using elements of nature. In another example, the remote data is business data associated with the organization. The business data can be evaluated to generate performance metrics which can be graphically presented in the virtual environment using elements of nature that are frequently found in the nature scene.

Figure 2:
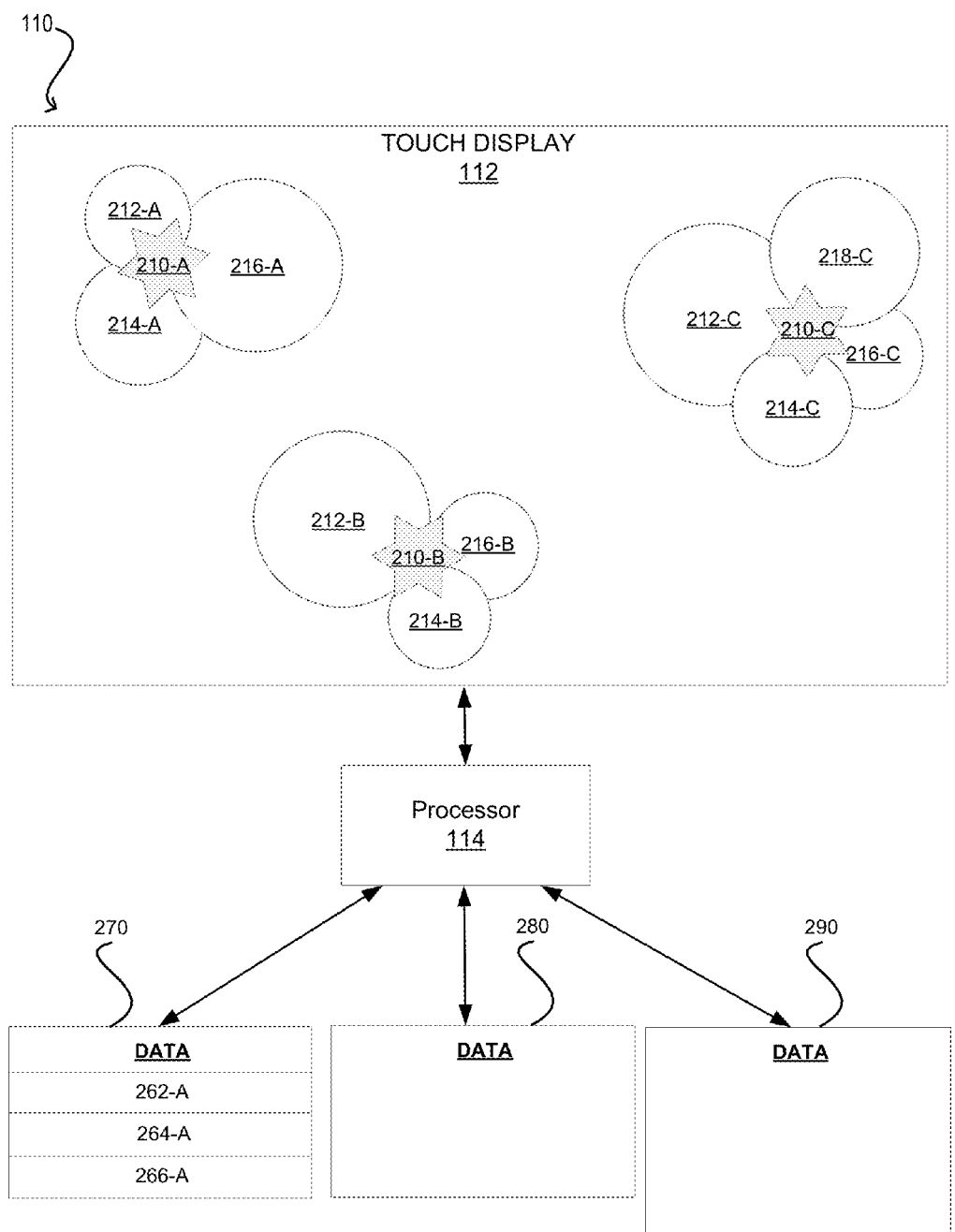
FIG. 2 illustrates a tabletop device according to one embodiment.

FIG. 2 illustrates tabletop device 110 according to one embodiment. As shown, tabletop device 110 includes touch display 112 and processor 114. Processor 114 processes business data from charts 270, 280, and 290 to create nature elements that are presented as part of the virtual environment displayed in touch display 112. Charts 270, 280, and 290 can belong to the same table or the same database. Alternatively, charts 270, 280, and 290 can be from different tables, data sources (local versus remote), and/or databases. Touch display 112 can display a virtual environment corresponding to a nature scene such as a pond. Nature elements in the pond, which can include water lilies, lily pads, fireflies, water insects, and fish, can represent the processed business data. Each type of nature element can serve a specific purpose in the virtual environment. In some examples, processor 114 can generate the pond first and subsequently populate nature elements into the pond based on received business data. The business data received can be specified by user 105 through touch display 112 or some other user interface. In other embodiments, the virtual environment can resemble other nature scenes such as ocean, a lake, a stream, and a forest. In these nature scenes, the processed business data would be represented using nature elements that are frequently found in the selected nature scene.

Here, processor 114 processes received data 262-A to generate a KPI. The KPI is a value for user 105 to evaluate data 262-A. In one example, the KPI can be generated by performing a statistical operation on data 262-A. In another example, the KPI can simply be the most recent entry in data 262-A. In yet another example, the KPI can be preprocessed and stored as a value in data 262-A. A KPI can also be determined for data 264-A and 266-A. In some embodiments, other forms of performance metrics can be generated instead of a KPI.

Processor 114 can generate an icon for each KPI. The icons, which can be elements that are naturally found in the virtual environment, can all be of the same type for each KPI. For instance, all KPIs can be graphically represented by a lily pad icon. In other examples, processor 114 can generate different nature elements for a KPI. This can depend on the chart which the KPI belongs to. For instance, processor 114 can generate an icon of a first type of water plant for KPIs from chart 280 and an icon of a second type of water plant for KPIs from chart 290. Alternatively, processor 114 can generate lily pad icons for KPIs from charts 280 and 290. Lily pad icons that correspond to different charts can include a distinct feature to visually distinguish themselves from other charts. For instance, lily pad icons for KPIs from chart 280 can have a single notch around the perimeter while lily pad icons for KPIs from chart 290 have two notches around the perimeter. This allows user 105 to distinguish the two charts by looking at the number of notches in the lily pad icons. In other embodiments, other elements that naturally appear in a pond can be generated to represent each KPI.

Processor 114 can also generate a group icon for each chart. The group icon can be an element that is naturally found in the virtual environment. In the pond virtual environment where KPIs are graphically represented by lily pad icons, a chart associated with the KPIs can be graphically represented by a water lily icon since a water lily appears in nature along with lily pads. In other examples, other nature elements that are closely related to the nature element representing the KPI can be used. By using lily pads and water lilies, this graphical representation of charts and KPIs have a timeless feature that would transcend space and time. Here, processor 114 generates water lily icon 210-A to graphically represent group 270. Processor 114 can cluster lily pad icons that represent data in group 270 (e.g., lily pad icons 212-A, 214-A, and 216-A) around water lily icon 210-A to provide a visual indication that the lily pads are generated from data within chart 270. Together, group icon 210-A and lily pad icons 212-A, 214-A, 216-A form a collection of icons that represent chart 270.

Processor 114 processes chart 280 in a similar fashion as chart 270, thus generating lily pad icons 212-B, 214-B, and 216-B that cluster around water lily icon 210-B. Together, water lily icon 210-B and lily pad icons 212-B, 214-B, and 216-B form a collection of icons that represent chart 270. Processor 114 also processes chart 290 to generate lily pad icons 212-C, 214-C, 216-C, 218-C which are clustered around water lily icon 210-C (forming another collection of icons). In some examples, water lily icons 210-A, 210-B, and 210-C can be visually represented as different species of water lilies. By using different species, user 105 can easily identify one grouping of lily pads from another grouping of lily pads in the virtual environment. For example, water lily icon 210-A can be a water lily with five pedals, water lily icon 210-B can be a water lily with six pedals, and water lily icon 210-C can be a water lily with eight pedals. In some embodiments, processor 114 can generate the lily pads and water lilies with a textual identifier to identify the source of a lily pad or water lily. The textual identifier can be turned on and off from user input. In other embodiments, dragging a water lily icon on touch display 112 can move the water lily along with the clustered lily pads to another location on touch display 112. In yet other embodiments, the business data and groupings of business data can be graphically represented using other elements that naturally appear in the virtual environment.

User 105 can specify the business data that is to be evaluated on touch display 112. User 105 can select business data from local database 125 and remote data from server 132 or remote database 136 to be presented in a virtual environment on touch display 112. Collections of icons that represent the selected business data can be presented in the virtual environment. When user 105 logs out of tabletop device 110 and another user logs into tabletop device 110, the virtual environment can be reconfigured for the other user. When user 105 subsequently logs back into tabletop device 110, the virtual environment on touch display 112 can be reconfigured so that user 105 resumes at the same state as when he had logged out. There may be slight changes to the virtual environment or elements in the virtual environment due to changes to the underlying business data. In some examples, a period of inactivity can result in touch display 112 reducing its brightness to conserve energy in tabletop device 110. When user input is received, tabletop device 110 can increase the brightness of touch display 112 to resume tabletop device 110. Resuming the tabletop device 110 can cause the virtual environment to be updated with new business data in charts 270, 280 and 290.

Figure 3:
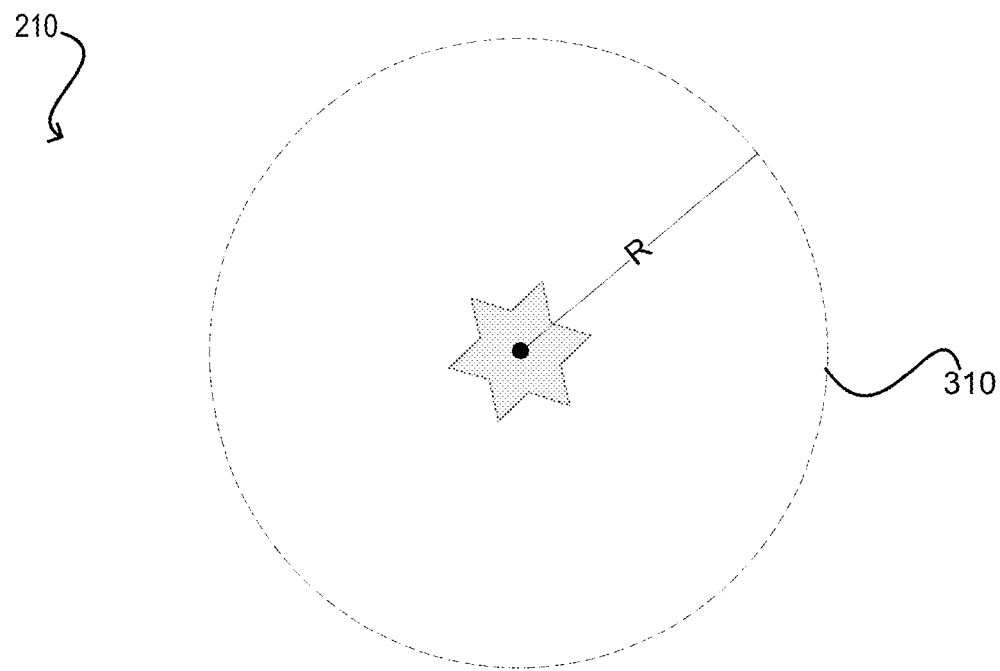
FIG. 3 illustrates a group icon according to one embodiment.

In some embodiments, an icon (e.g., lily pad) from one collection of icons can be moved to another collection of icons. This action can be performed by processor 114 in response to receiving a user input moving the icon on the touch display 112 from one collection to another. The flexibility to rearrange the collection of icons allows user 105 to dynamically group the icons as he or she sees fit rather than being confined to the groupings in the underlying database. FIG. 3 illustrates group icon 210 according to one embodiment. Group icon 210 includes boundary 310 which is an invisible boundary that surrounds group icon 210. Here, boundary 310 is a circle of circumference R however in other embodiments, boundary 310 can be another shape. Functionally, boundary 310 can serve as a boundary which can be used by processor 114 to group icons. When an icon that belongs to a different collection of icons than group icon 210 is moved to a location within boundary 310, processor 114 can associate the icon with group icon 210 so that the icon now belongs to the same collection as group icon 210. Processor 114 can cluster icons that belong to the same group as group icon 210 around group icon 210.

In some embodiments, the boundaries of two group icons can overlap. This can occur when one group icon is within the boundary of another group icon or when the boundaries of two group icons are large enough to overlap. When an icon that is clustered to a group icon other than the two group icons is moved into the overlapping portion, processor 114 can cluster the moved icon with one of the two group icons. In one embodiment, processor 114 can determine which of the two group icons is in closer proximity with the moved icon and cluster the moved icon with the group icon that is nearer. When the icon is moved to a location on touch display 112 that is not within a boundary, no changes are made to the combination of icons. As a result, processor 114 can snap the moved icon back to the group icon that it belongs to, where the moved icon remains clustered around the group icon. Snapping can include moving the moved icon quickly back to the boundary of the group icon that it belongs to followed by a slower motion clustering the moved icon to the group icon.

In some embodiments, processor 114 can modify the data in tables and databases when an icon from one collection of icons is moved to another collection of icons. This can allow user 105 to rearrange the business data in the underlying database or databases according to how the icons are grouped as collections in the virtual environment. For example, processor 114 can move data from group 280 to group 270 when icon 212-B is moved from belonging with group icon 210-B to belonging with group icon 210-A. In other embodiments, moving an icon from one collection to another collection changes the collections in the virtual environment but does not affect the underlying data.

Figure 4:
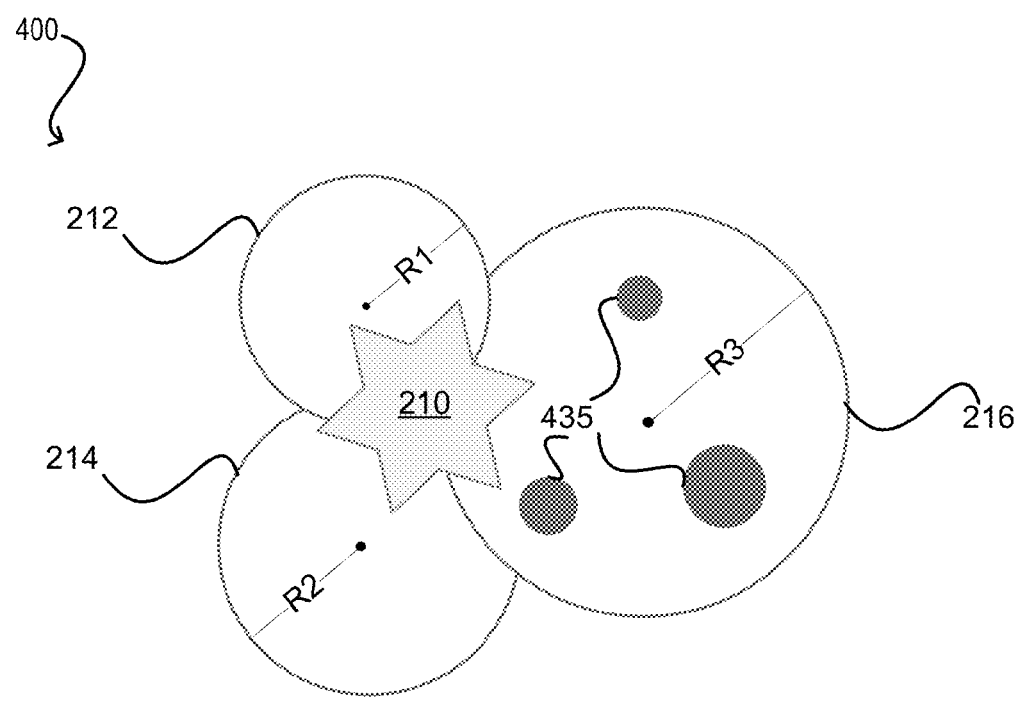
FIG. 4 illustrates a collection of icons according to one embodiment.

FIG. 4 illustrates collection of icons 400 according to one embodiment. Collection 400 can be presented in a virtual environment and includes group icon 210 and icons 212, 214, and 216. As described above, icons 212, 214, and 216 can be configured to graphically represent performance metrics that are used to evaluate the success of an organization. Each performance metric can be based on a group of business data. In some embodiments, processor 114 can dynamically modify the size and visual appearance of icon 212 to convey additional information related to the corresponding performance metric. This can allow user 105 to quickly identify which performance metrics represented in the virtual environment require a closer evaluation based on the appearance of the icons.

In some embodiments, processor 114 can modify the size of an icon to convey information about a first attribute of a corresponding performance metric. In one embodiment, the size of an icon can indicate a change to the performance metric. This allows changes to the performance metric to be easily evaluated by user 105 by simply viewing the size of the icon. In one example, processor 114 can change the size of icon 212 proportionally to a variance percentage parameter associated with the corresponding performance metric. A variance percentage parameter measures the percentage change in the performance metric between an old value and a new value. The performance metric can be periodically updated from an old value to a new value when new business data is periodically introduced into the group of business data. Old values can be stored to monitor the change to the performance metric over time.

In one example, processor 114 can adjust the size of icon 212 according to the absolute value of the variance percentage parameter. Thus, processor 114 can enlarge icon 212 when a large negative change or a large positive change to the performance metric is detected. Enlarging icon 212 when a large change occurs to a performance metric (either positive or negative) can make icon 212 more noticeable. Thus, the larger size icon can serve as a notification to user 105 that the corresponding performance metric may need a closer examination. For instance, if the old performance metric value was 10 and the new performance metric value is 15, then the variance percentage parameter can be calculated by (new_value−old_value)/old_value*100, which would be a positive 50%. Processor 114 can modify icon 212 by making it 50% larger than the default icon size. Enlarging icon 212 can include modifying radius R1 of icon 212. Here, the performance metric corresponding to icon 212 has seen less fluctuation than the performance metric corresponding to icon 214 since icon 212 has a smaller radius than icon 214. The performance metric corresponding to icon 216 has seen the most fluctuation since radius R3 is larger than radius R2 and radius R1.

In some embodiments, processor 114 can modify the appearance of an icon such that the appearance conveys information about a second attribute of the performance metric. For example, the appearance of an icon can represent the health of a corresponding performance metric. Processor 114 can determine the health of the performance metric by comparing the performance metric against a predefined baseline value. The predefined baseline value represents a baseline for defining the success or failure of the performance metric. In one example, a performance metric that is less than the baseline value is considered a failure. In another example, a performance metric that is greater than the baseline value is considered as success. Once the health of the performance metric is determined, processor 114 can alter the visual appearance of the icon in accordance to the attribute.

In one embodiment, the visual appearance of the icon can be modified by processor 114 such that the icon appears healthy or unhealthy. The healthiness and unhealthiness of the icon can be directly related to the health of the performance metric. In some examples, a healthy or unhealthy appearance can depend on the nature element that the icon is representing. In the lily pad icon example, a healthy lily pad can be bright green while an unhealthy lily pad can be dullish green with brown spots or brown depending on the degree of unhealthiness. In other examples, a healthy or unhealthy appearance can depend on the appearance of the element in nature. For instance, a healthy fish can appear vibrant and active while an unhealthy fish can appear dull and sluggish. Here, process 114 can determine the health of performance metrics that are correspond to icons 212, 214, and 216. Icons 212 and 214 are determined to be healthy while icon 216 is determined to be unhealthy. As a result, process 114 can present healthy lily pads for icons 212 and 214. In contrast, process 114 can present an unhealthy lily pad for icon 216. Unhealthy lily pad 216 has brown spots 435. The large size of the lily pad plus the brown spots provides visual cues that the performance metric has experienced a large change and that it is not performing well. The combination of the health of the lily pad plus the size can lead user 105 to further investigate the performance metric. In other embodiments, other attributes of the performance metric can be represented by adjusting the visual appearance of icons 212, 214, and 216.

In some embodiments, processor 114 can also adjust the size and appearance of the group icon to present additional information about the group. The adjustments can be similar to the adjustments for the individual icons. For example if the health of a majority of the icons in the collection are poor, the group icon can also appear unhealthy. The size of the group icon can also be adjusted in a similar fashion.

Figure 5:
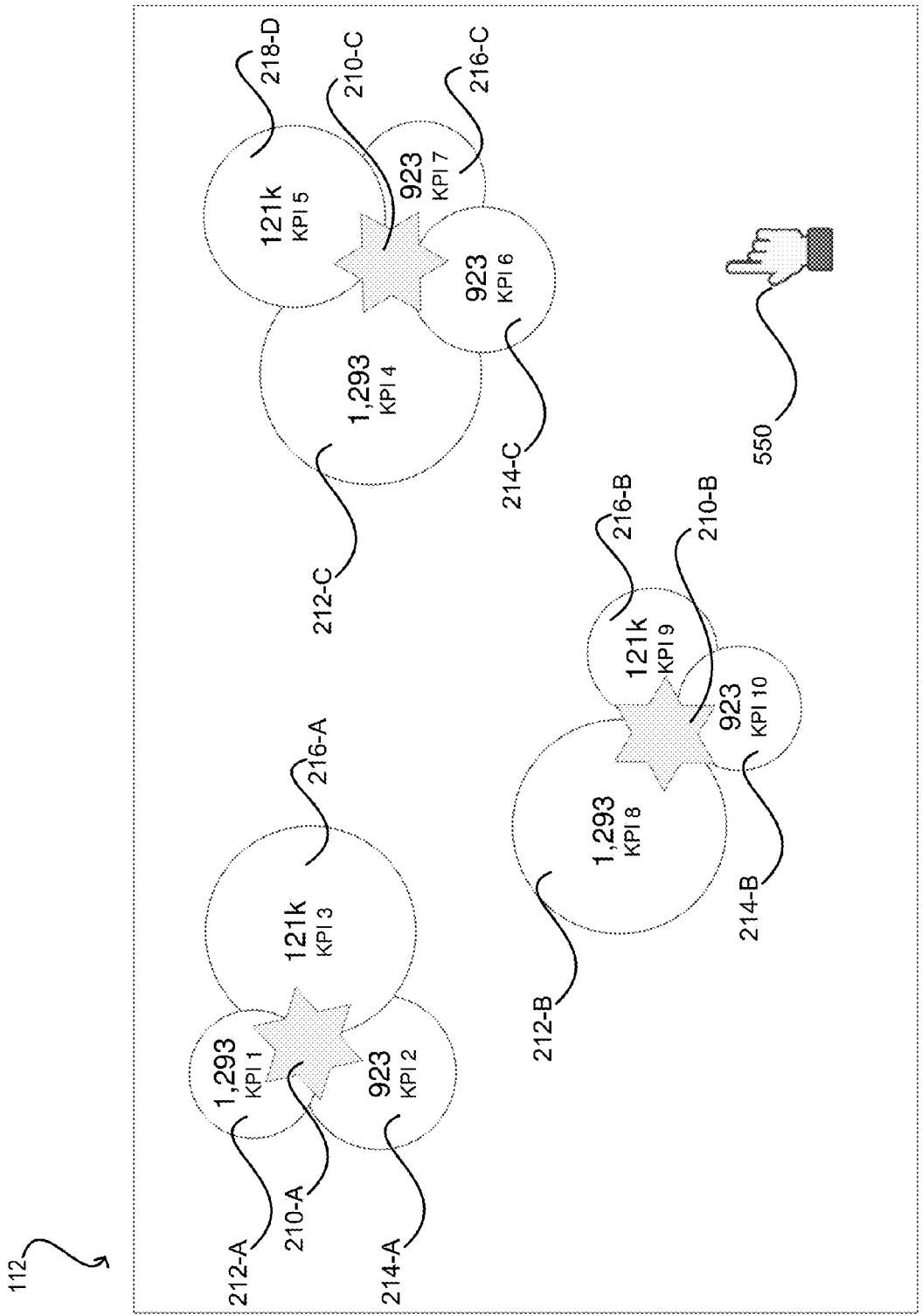
FIG. 5 illustrates a touch display according to one embodiment.

FIG. 5 illustrates touch display 112 according to one embodiment. Touch display 112 is displaying a virtual environment of a pond containing a first collection having lily pads 212-A, 214-A, and 216-A clustered around water lily 210-A, a second collection having lily pads 212-B, 214-B, and 216-B clustered around water lily 210-B, and a third collection having lily pads 212-C, 214-C, 216-C, and 218-C clustered around water lily 210-C. A user can move a collection of lily pads by moving the corresponding water lily. As some point, touch display 112 can detect touch event 550. Touch event 550 can be user 105 touching an area of the virtual environment that is not occupied by a water lily or lily pad. When touch event 550 is detected on touch display 112, processor 114 can display information on each lily pad. The information can include a summary of each performance metric that corresponds with the lily pad. The summary can include an identifier such as a title for the performance metric (e.g., KP1, KP2, KP3, etc.) and a value associated with the performance metric. In some examples, processor 114 can display information for a collection of lily pads when the water lily that corresponds with the collection is touched by user 105. As shown here, identifies and their values are presented on each lily pad. This can provide an overview of the performance of the organization.

Figure 6:
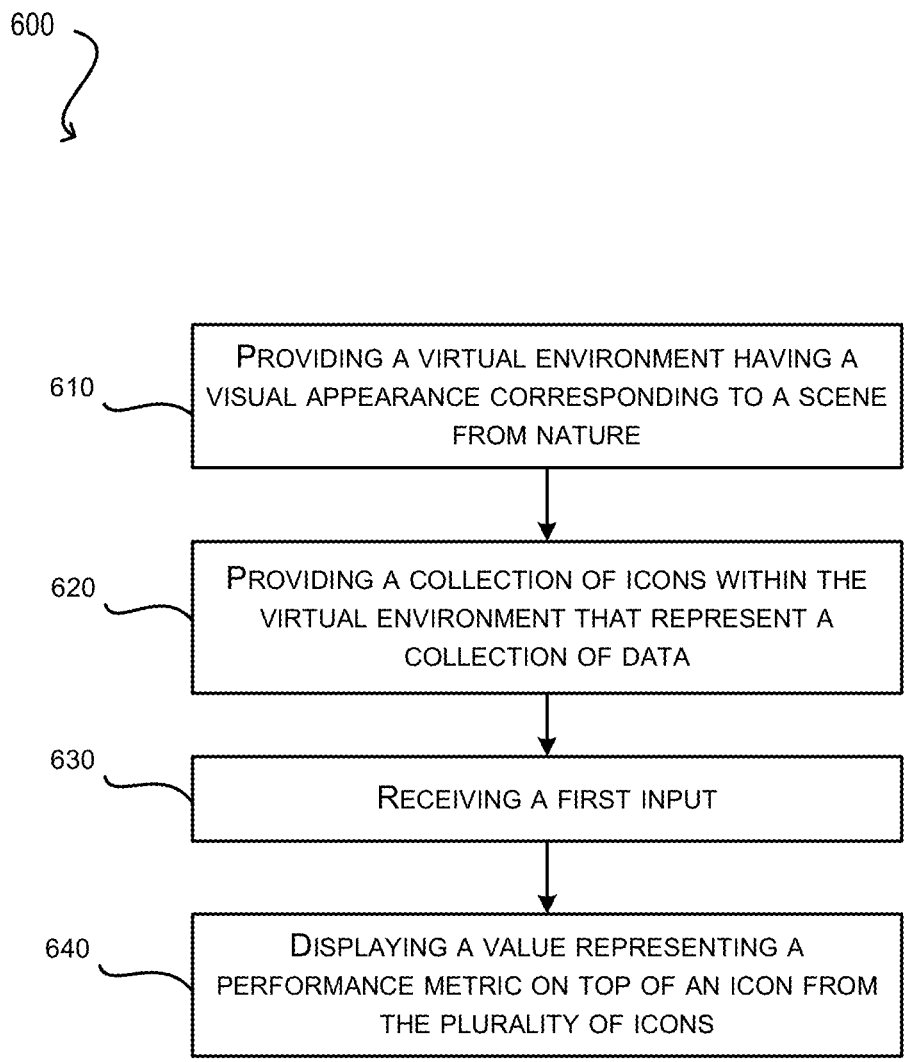
FIG. 6 illustrates a process flow for providing a interacting with a virtual environment according to one embodiment.

FIG. 6 illustrates a process flow for providing a interacting with a virtual environment according to one embodiment. Process 600 can be stored in computer readable medium and executed by a processor such as processor 114 in FIG. 1. Process 600 begins by providing a virtual environment having a visual appearance corresponding to a scene from nature at 610. In one example, the virtual environment can be a body of water, such as a pond. After providing the virtual environment, process 600 continues by providing a collection of icons within the virtual environment that represent a collection of data at 620. The collection of icons can include a plurality of icons that represent a plurality of performance metrics derived from a collection of data. The collection of icons can further include a group icon configured for identifying the plurality of icons. The plurality of icons can cluster around the group icon. After providing the collection of icons, process 600 can receive a first input at 630. The first input can be the user physically contacting a touch display, for example through a tap gesture. In response to the tap gesture, process 600 can display a value representing a performance metric on top of an icon from the plurality of icons at 640. For example, an identifier and a value associated with a performance metric can be displayed on top of an icon corresponding to the performance metric. The value of the performance metric can be correlated to the visual appearance of the icon.

Figure 7:
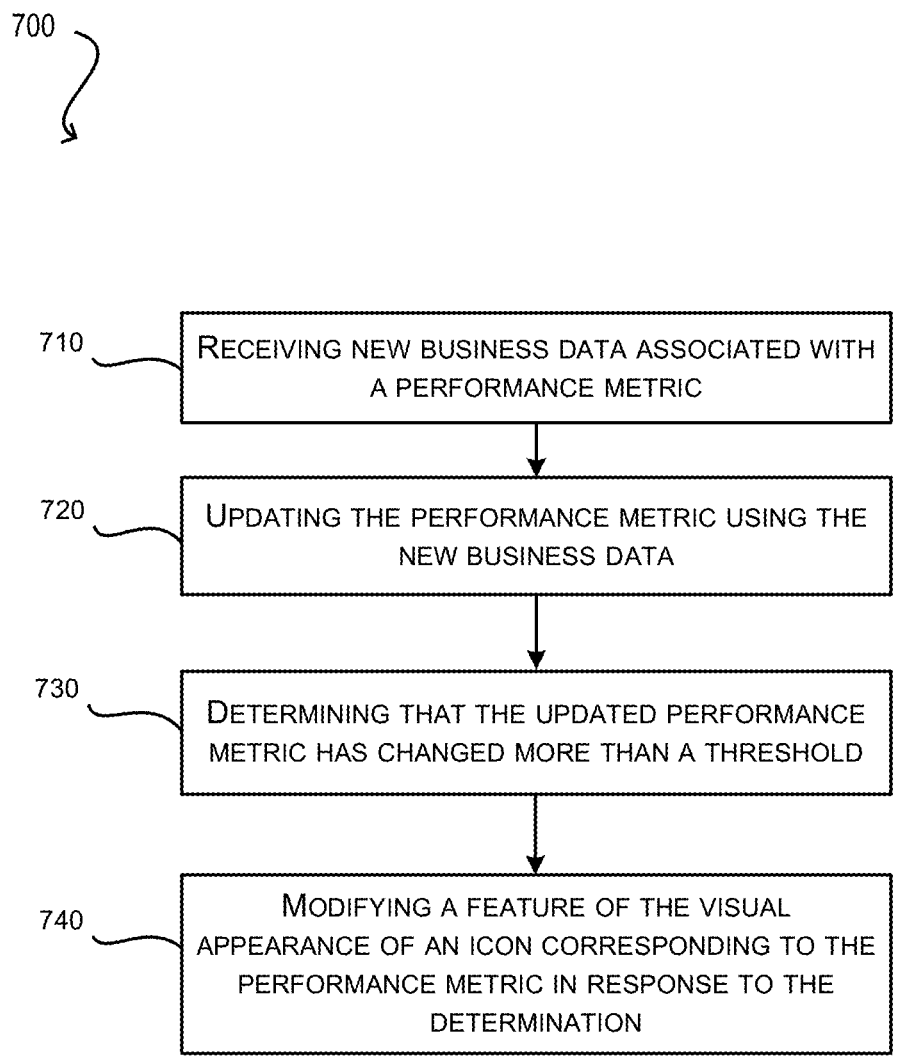
FIG. 7 illustrates a process flow for modifying a feature of the visual appearance of an icon according to one embodiment.

FIG. 7 illustrates a process flow for modifying a feature of the visual appearance of an icon according to one embodiment. The visual appearance of the icon can change when the underlying data of the icon is updated. Process 700 can be stored in computer readable medium and executed by a processor such as processor 114 in FIG. 1. Process 700 begins by receiving new business data associated with a performance metric at 710. For example if the performance metric is customer satisfaction, new customer satisfaction surveys may have been received. Upon receiving the new business data, process 700 continues by updating the performance metric using the new business data at 720. This can include calculating a new value for the performance metric based on the new business data. Process 700 then continues by determining that the updated performance metric has changed more than a threshold at 730. If the performance metric has changed more than a predefined threshold, this can trigger modification of a feature of the visual appearance of the icon. Process 700 then continues by modifying a feature of the visual appearance of an icon corresponding to the performance metric in response to the determination at 740. In some examples, the feature can be the size, shape, appearance, or other visual trait associated with the icon. By only modifying the visual appearance only when the change is more than a predefined threshold, the appearance of the icon will appear more stable.

Figure 8:
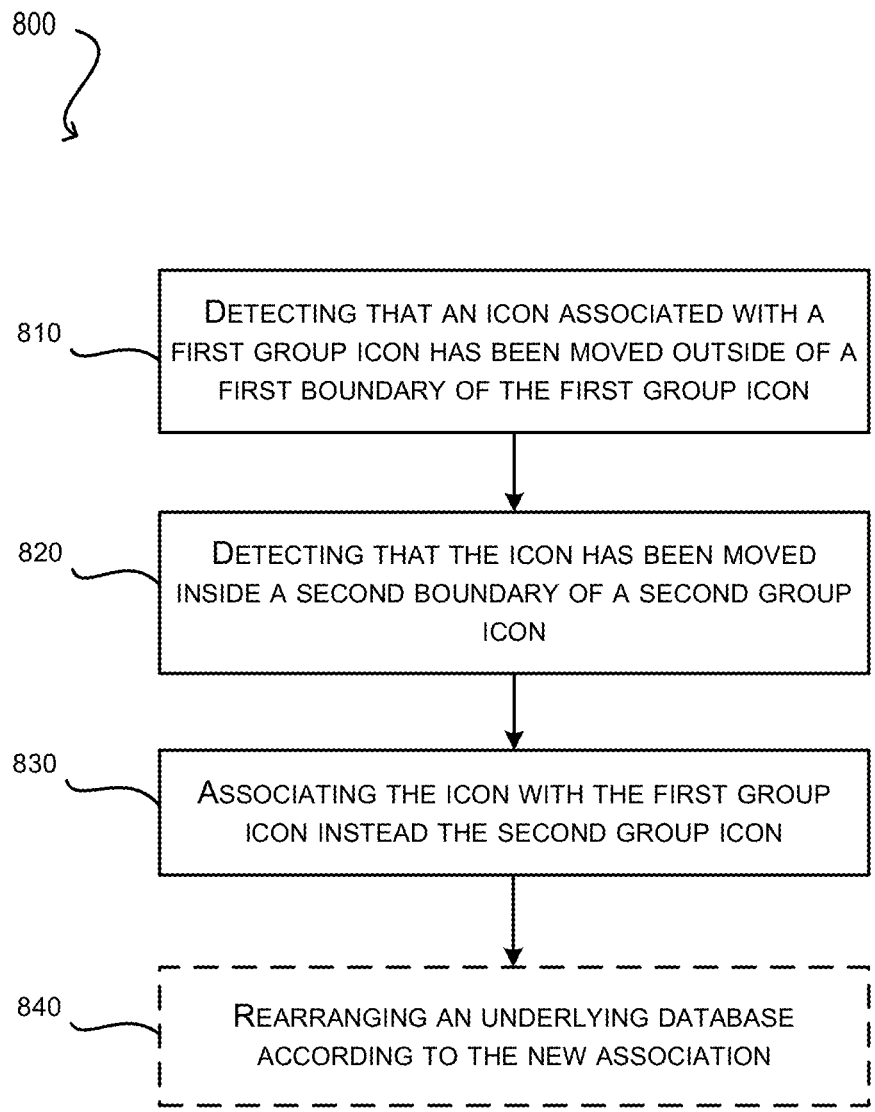
FIG. 8 illustrates a process flow for moving icons between collections according to one embodiment.

FIG. 8 illustrates a process flow for moving icons between collections according to one embodiment. Process 800 can be stored in computer readable medium and executed by a processor such as processor 114 in FIG. 1. Process 800 begins by detecting that an icon associated with a first group icon has been moved outside of a first boundary of the first group icon at 810. The icon and the first group icon can both belong to a first collection of icons that represent a first collection of data where the first boundary describes the boundary in which the first collection of icons reside. When the icon moves outside of the first boundary, there is a possibility that association between the icon and the first group icon will be replaced by an association between the icon and a second group icon. Process 800 then continues by detecting that the icon has been moved inside a second boundary of a second group icon at 820. The second boundary can describe the boundary in which icons in a second collection of icons reside. By moving the icon from the within the first boundary to within the second boundary, process 800 can interpret the action as a request to transfer the icon's association from the first group icon to the second group icon. At 830, process 800 continues by associating the icon with the first group icon instead of the second group icon. By associating the icon with the second group icon, the icon can now cluster around the second group icon. In some examples, associating the icon with the second group icon can cause the icon to move with the second group icon when an instruction is received to move the second group icon. Optionally, process 800 can also rearrange an underlying database according to the new association at 840. Rearranging the underlying database can include moving data associated with the icon from a first collection of data to a second collection of data that is being represented by the second collection of icons. In some examples, process 800 can examine the first collection of data to determine if there is any data that is no longer needed due to the move of the first icon. This data can be deleted from the first collection of data. Similarly, process 800 can examine the second collection of data to determine if there is any data that needs to be added from the first collection of data due to the move of the first icon. This data can be added to the second collection of data.

Data Visualization and Search Queries

Figure 9:
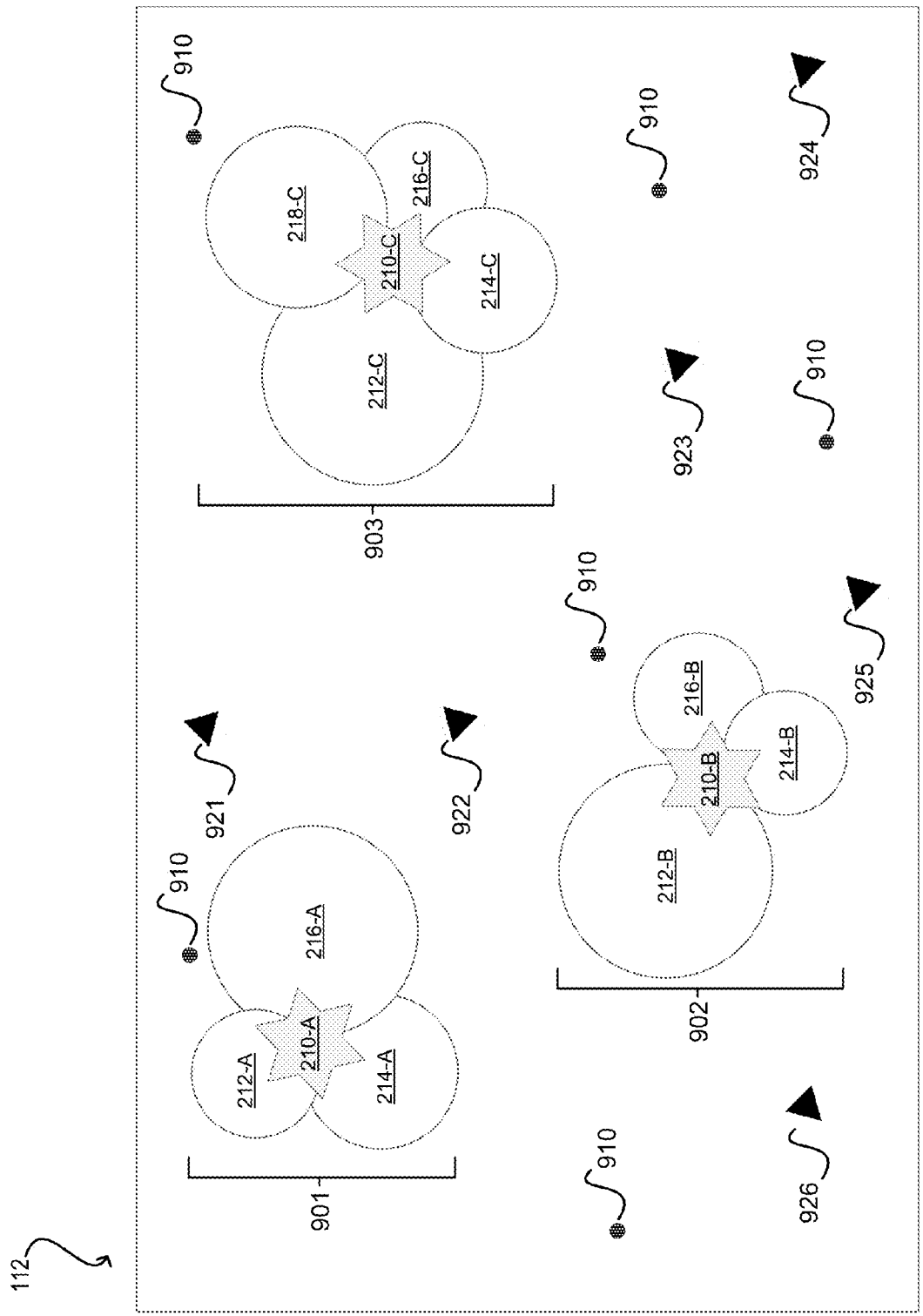
FIG. 9 illustrates a touch display according to one embodiment.

FIG. 9 illustrates touch display 112 according to one embodiment. Touch display 112 includes three collections of icons; collection 901, collection 902, and collection 903. Icon collections 901, 902, and 903 are configured to represent business data. Each icon collection can each represent a collection of data in one or more databases. Collection 901 includes icons 212-A, 214-A and 216-A clustered around group icon 210-A. Icon 212-A, 214-A, and 216-A can each correspond to a performance metric of the business data. Collection 902 includes icons 212-B, 214-B, and 216-B clustered around group icon 210-B. Similarly, collection 903 includes icons 212-C, 214-C, 216-C, and 216-D clustered around group icon 210-C. These icons and group icons have been described above.

Touch display 112 further includes supplemental icons other than the collection of icons that represent business data. The supplemental icons can be configured to improve the aesthetic beauty of the virtual environment. In some examples, the supplemental icons can also provide additional functionality to the virtual environment. In one example, the supplemental icons can be used in visualizing details on business data or other information in the database. In another example, the supplemental icons can be used to for visualizing the results of a search query. The icons can belong to collections where the icons in the same collection can be represented by the same type of element. The type of element can be something that can naturally be found in the nature scene, thus maintaining the theme of the virtual environment.

Here, collection 910 and the collection comprising icons 921-926 are also included in the virtual environment and are considered supplemental icon collections. The supplemental icon collections can be configured to provide other functionality to the visual environment. In the pond environment, icons in collection 910 can be represented by firefly icons and icons 921-926 can be represented by koi fish icons. In other nature inspired virtual environments, these additional icons can be represented using elements that can be found in the scene from nature. In one embodiment, collection 910 and icons 921-926 can positioned in the virtual environment as they would naturally appear in nature. For example, firefly icons and koi fish icons can be scattered randomly around the virtual environment. In another embodiment, collection 910 and icons 921-926 can be animated to move similarly as the elements of nature that they are representing. For example, icons 921-926 which represent koi fish can move around the pond in a manner that is representative of live koi fish in nature while icons in collection 910 which represent fireflies can move around the pond in a manner that is representative of live fireflies in nature. The number of icons that in the supplemental collections can fluctuate as icons move in and out of the virtual environment.

Figure 10:
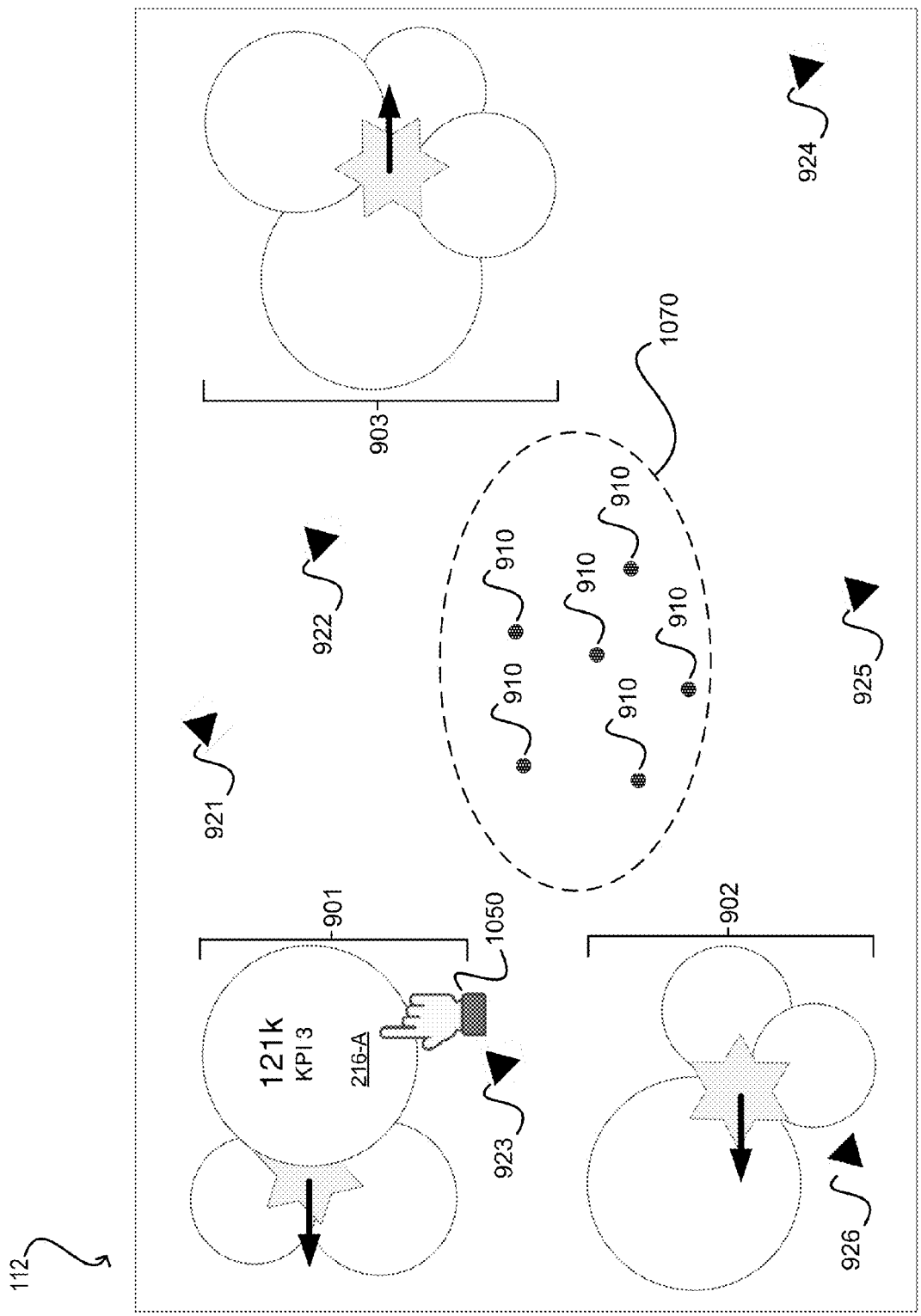
FIG. 10 illustrates a touch display after selecting an icon corresponding to a performance metric according to one embodiment.

FIG. 10 illustrates touch display 112 after selecting an icon corresponding to a performance metric according to one embodiment. As shown here, touch display 112 has received user input 1050 which is representative of selecting icon 216-A belonging to collection 901. In other examples, the user input can be received on a device other than touch display 112. For instance, the user input can be received via peripheral devices such as a keyboard, a mouse, or a touch pad. When the icon corresponding to a performance metric is selected, processor 114 can present additional details related to the selected performance metric on touch display 112. For example, a bar chart, a pie chart, a line graph, or other form of chart/graph can be presented as additional details. The additional details can be generated by analyzing the business data associated with the performance metric.

In one embodiment, processor 114 visualizes the additional details using one or more of the supplemental collections of icons present in the virtual environment. To visualize the additional details, icons from a supplemental collection of icons can converge at a predefined area of the virtual environment. Upon converging at the predefined area, the supplemental collection of icons can then be used to visualize the additional details. In some examples, icons other than the supplemental collection of icons can be moved outside the predefined area to make room for the supplemental collection of icons. Here, processor 114 can move icons in collection 910 to predefined area 1070. Processor 114 can also move icon 922 outside the predefined area 1070.

In another embodiment, processor 114 can move other icons in the virtual environment when visualizing the additional details. This can dedicate more space in the virtual environment to the visualization of the additional details. For example, icons and collections can be moved towards the edges of the virtual environment. Here, collections 901, 902, and 903 move towards the edges of touch display 112 for the presentation of additional details related to the performance metric corresponding to icon 216-A.

In yet another embodiment, the virtual environment can be dimmed and a spotlight can be provided on the selected icon when visualizing the additional details. This can help identify the performance metric that the additional details is related to. When touch display 112 receives another user input representative of selecting icon 216-A a second time or touching elsewhere in the virtual environment, the visualization of the additional details may end and the virtual environment can return to the state shown in FIG. 9. In other examples, other touch gestures such as a pinch gesture can return the virtual environment to the state shown in FIG. 9.

In other embodiments, processor 114 can generate new icons at predefined area 1070 for visualizing the additional details. The new icons can be similar to icons from a supplemental collection of icons that remain scattered around the virtual environment. In some examples, icons from the supplemental collection of icons scattered around the virtual environment that are located within the boundaries of predefined area 1070 can join and become part of the visualization.

Figure 11:
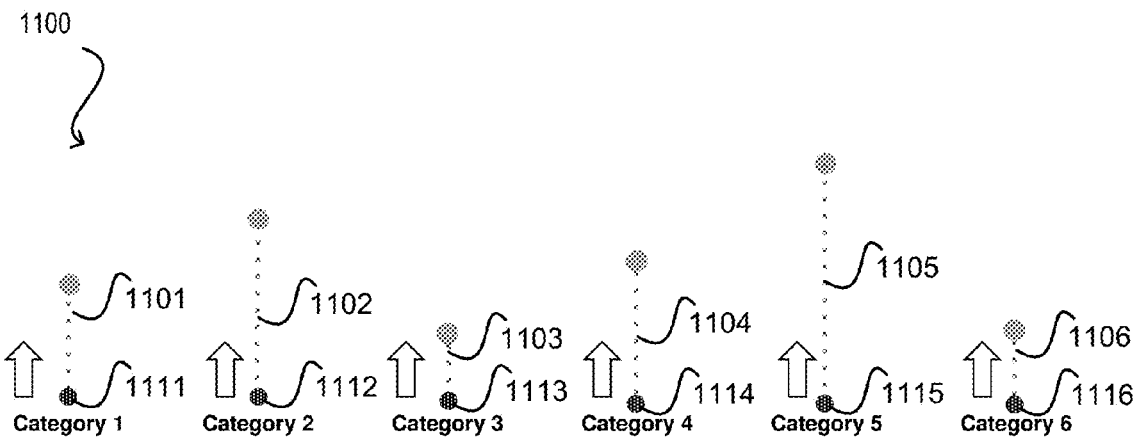
FIG. 11 illustrates the visualization of additional details of a performance metric according to one embodiment.

FIG. 11 illustrates the visualization of additional details of a performance metric according to one embodiment. In one embodiment, visualization 1100 is a bar chart generated using icons from collection 910 in the virtual environment. Processor 114 can generate visualization 1100 once the supplemental collection of icons have converged at the predefined area in the virtual environment. In some examples, the number of icons from the supplemental collection that converge at the predefined area can be determined by the additional details being presented. For instance if a bar chart having five bars is being visualized as the additional details, five icons from the supplemental collection of icons may converge at the predefined area. In other examples, icons from the supplemental collection that are not needed to visualize the additional details can converge at the predefined area and then disappear.

Here, processor 114 generates a bar chart for a performance metric corresponding to selected icon 216-A. The bar chart includes six categories that are each represented by a bar. In other examples, different types of charts can be generated. The type of chart generated can be depend on the additional details being visualized or can be predefined for each performance metric. Processor 114 can generate visualization 1100 by assigning each category in the bar chart to an icon from collection 910. The assigned icons can start lined up in the x axis above the category names. Processor 114 can animate the assigned icons by moving them in the vertical axis along corresponding paths 1101-1106 until a value associated with the corresponding category is reached. In some examples, a trail can remain to track the movement of each icon. Here, the bars of the bar chart can be visualized using firefly icons. A number of fireflies corresponding to the number of bars in the bar chart can converge at the predefined area in a horizontal line on the x axis. The bar for category 1 can be visualized by a firefly icon above the title "Category 1." The firefly icon can be animated to resemble a bar of the bar chart by moving up until a value that corresponds with the bar of category 1 is reached. As the firefly icon moves up, a trail of lights can remain. The trail of lights together with the firefly icon can resemble a bar in a bar chart.

In another embodiment, processor 114 can generate a particle system capable of creating visualization 1100. Instead of depending on icons from the supplemental collection 910, the particle system can emit new icons to create visualization 1100. The new icons can be emitted from emitters in the particle system and can appear similar to the icons from the supplemental collection. In some examples, the icons emitted can have a predefined target, follow a predefined path, and/or have a predefined lifespan. The icons can also have properties such as attraction and repulsion forces with other emitted icons or icons in the virtual environment which may control the movements of the icon in a dynamic and random fashion. At the end of the predefined lifespan, emitted icons can fade and disappear from the virtual environment.

Here, the particle system can include a series of emitters 1111-1116 positioned along the x-axis above the names of the categories. Each emitter can emit icons that travel along corresponding paths 1101-1106 until the icons reach the end of the paths. The end point of the paths can represent a value that corresponds with each category. As the emitted icons move along their corresponding path, they may move in a dynamic fashion in response to attraction and repulsion forces present in the virtual environment. The forces can come from other icons or the virtual environment. In some examples, processor 114 can predefine the lifespan of an emitted icon can be longer than the time it takes for the emitted icon to reach its predefined target or the end of its predefined path (i.e., end point). This allows emitted icons to collect at the end point. The higher concentration of emitted icons at the end point can help convey the value that corresponds with the category. The value that corresponds with the category can optionally be presented near the end point. As emitted icons travel the predefined paths, the predefined paths can resemble bars in a bar chart. In the firefly icon example, firefly icons can be created by the emitters and travel the predefined path and collect at the end of the paths. The higher concentration of firefly icons at the end of the paths can allow visualization 1100 to illustrate the value associated with a given bar.

In some examples, icons from supplemental collection 910 that are similar to the emitted icons can be attracted to the emitted icons and inherit some of the properties of the emitted icons. For example, an icon from supplemental collection 910 that is within a predefined distance of one or more emitted icons can be attracted to the emitted icons and take on one or more properties of the emitted icons. Upon taking on the properties, the icon can travel the same path as the emitted icon and can also have the same lifespan as the emitted icon. As a result, icons from supplemental collection 910 can become part of the particle system.

Figure 12:
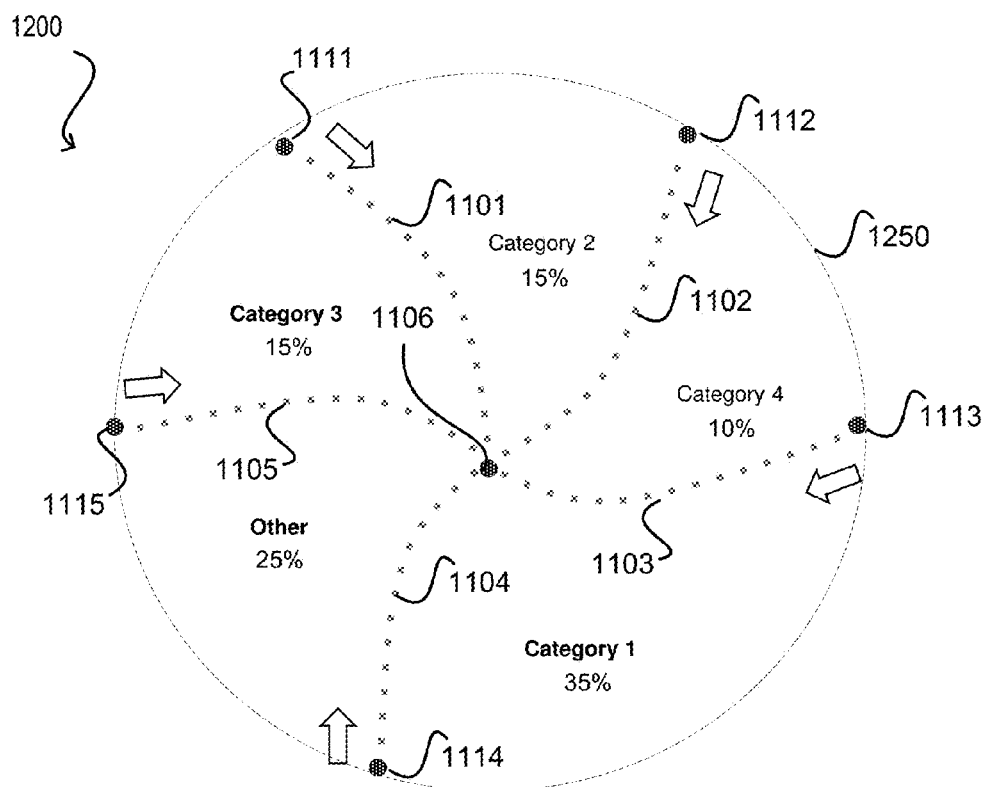
FIG. 12 illustrates the visualization of additional details of a performance metric according to another embodiment.

FIG. 12 illustrates the visualization of additional details of a performance metric according to another embodiment. Visualization 1200 is a pie chart that is made up of a plurality of sectors that each represent a category. Visualization 1200 can be similar to visualization 1100 of FIG. 11 except that a different type of chart is being visualized.

In one embodiment, processor 114 can generate visualization 1200 using icons from the supplemental collection that have converged at the predefined area in the virtual environment. To generate visualization 1200, processor 114 can position icons from collection 910 along boundary 1250 of the pie chart. The icons can be positioned along boundary 1250 to define a plurality of arc lengths. Each arc length can be associated with a category of the pie chart and can be directly proportional to a value associated with the category. For example a category with a larger value will be associated with a larger arc length. The number of icons that are positioned along boundary 1250 can be the same as the number of sectors in the pie chart, thus resulting in the number of icons and the number of segments being the same. Here, category 1 has a value of 35%, which is the largest value of all the categories. As a result, the icons from collection 910 define an arc length associated with category 1 that is larger than all of the other arc lengths.

Once the icons have been positioned along boundary 1250, processor 114 continues by moving the icons toward the center of boundary 1250. In some examples, the rate in which the icons move towards the center can be substantially the same. In other examples, the icons can have properties such as attraction and repulsion properties that can affect the movement of the icons. As the icons move, a trail can remain to track the movement of each icon. When the icons reach the center of boundary 1250, the trails from the icons will resemble a pie chart where each sector of the pie chart represents a category. Here, the icons are firefly icons which are initially positioned along boundary 1250. As each firefly icon moves towards the center, they leave a trail of light. When the firefly icons reach the center, the trails of light can represent the pie chart.

In another embodiment, processor 114 can generate a particle system capable of creating visualization 1200. The particle system can be similar or substantially similar to the particle system described in FIG. 11. A series of emitters 1111-1115 can be positioned along boundary 1250 of the pie chart. Processor 114 can determine the position of each emitter by the value of the underlying category, similar to a traditional pie chart. For example, emitters 1113 and 1114 that are later used to define category 1 can be placed at positions along boundary 1250 to generate an arc length that is reflective of the value 35% associated with category 1.

Once processor 114 determines the position of the series of emitters 1111-1115, the emitters can produce emitted icons. The emitted icons can travel along a predefined path that corresponds with the producing emitter. Here, emitted icons from emitter 1111 travel along predefined path 1101, emitted icons from emitter 1112 travel along predefined path 1102, emitted icons from emitter 1113 travel along predefined path 1103, emitted icons from emitter 1114 travel along predefined path 1104, and emitted icons from emitter 1115 travel along predefined path 1105. In one example, predefined paths 1101-1105 can end at end point 1106, which is the center of the pie chart. In some examples, the lifespan of an emitted icon can be approximately the period of time it takes for the emitted icon to reach end point 1106. This can result in end point 1106 not being highlighted due to a higher concentration of icons at end point 1106. Alternatively, the lifespan of emitted icons can be longer than the period of time it takes for an emitted icon to reach end point 1106, thus highlighting the center of the pie chart. In other examples, icons from supplemental collection 910 that are similar to the emitted icons can become part of the particle system as described in FIG. 11.

Figure 13:
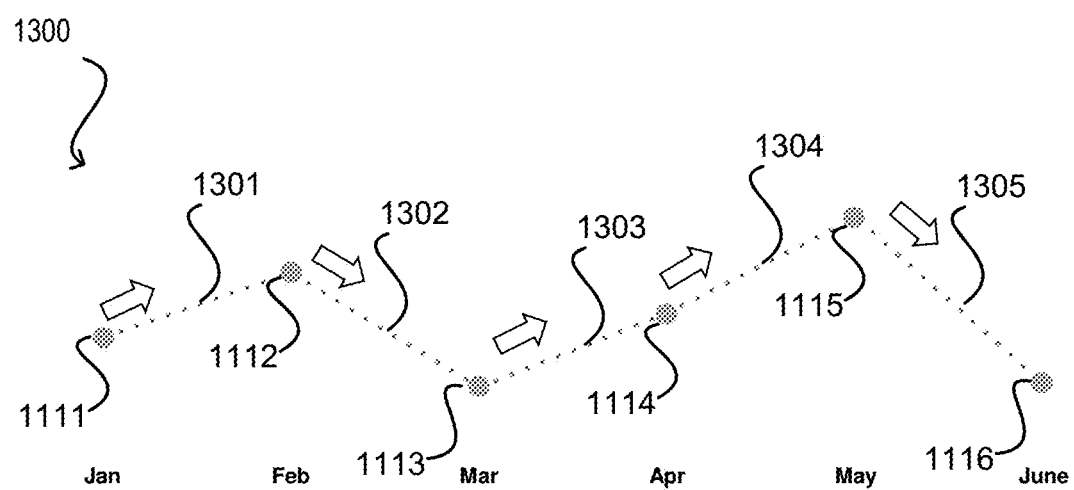
FIG. 13 illustrates the visualization of additional details of a performance metric according to another embodiment.

FIG. 13 illustrates the visualization of additional details of a performance metric according to another embodiment. As shown, visualization 1300 represents a line graph. The line graph illustrates a plurality of data points that are connected to illustrate changes to the performance metric over time. Visualization 1300 can be similar to visualization 1100 of FIG. 11 except that a line graph is being visualized rather than a bar chart.

In one embodiment, processor 114 can generate visualization 1300 using icons from the supplemental collection that have converged at the predefined area of the virtual environment. To generate visualization 1300, processor 114 can group the icons from collection 910 together at a first data point of the line graph. Once the icons from the collection 910 are grouped at the first data point, all of the icons except one can move from the first data point to the second data point. Moving the icons from the first data point to the second data point can leave a trail. When the icons reach the second data point, all of the icons on the second data point except one can move from the second data point to the third data point. This process can continue until the last data point is reached. The resulting visualization is a plurality of icons positioned at the data points with trails connecting the data points. Here, the icons from collection 910 are firefly icons and the number of firefly icons that converge as the predefined area can be the same as the number of data points in the line graph. The firefly icons can begin at the data point associated with January. All of the firefly icons except one can move from the first data point to the second data point. As the firefly icons move, they can leave a trail of light. This process can continue through the data points until the last data point is reached.

In another embodiment, processor 114 can generate a particle system capable of creating visualization 1300. The particle system can be similar or substantially similar to the particle system described in FIG. 11. A series of emitters 1111-1116 can be positioned at data points of the line chart. The data points can belong to the performance metric, for example describing changes to the performance metric over time. Each emitter can emit icons that travel a path to the subsequent emitter, except for the last emitter which is only a target. For example, emitter 1111 emits icons that travel along path 1301 until the icons reach emitter 1112. Similarly, emitter 1112 emits icons that travel along path 1302 until the icons reach emitter 1113, emitter 1112 emits icons that travel along path 1302 until the icons reach emitter 1113, emitter 1113 emits icons that travel along path 1303 until the icons reach emitter 1114, emitter 1114 emits icons that travel along path 1304 until the icons reach emitter 1115, and emitter 1115 emits icons that travel along path 1305 until the icons reach emitter 1116. Emitter 1116 can serve as a target only and does not emit icons. In one example, emitters 1111-1115 can being emitting icons simultaneously, thus causing paths 1301-1305 to be generated simultaneously. In another example, emitter 1111 can begin emitting icons. When one of the emitted icons reaches another emitter, the emitter can begin also emitting icons. This can be the case for emitters 1112-1115 (not emitter 1116 since it does not emit icons). As a result, the line graph is generated over time, with each path being generated sequentially. The lifespan of these emitted icons can be approximately the amount of time it takes to reach its target (e.g., next emitter).

Figure 14:
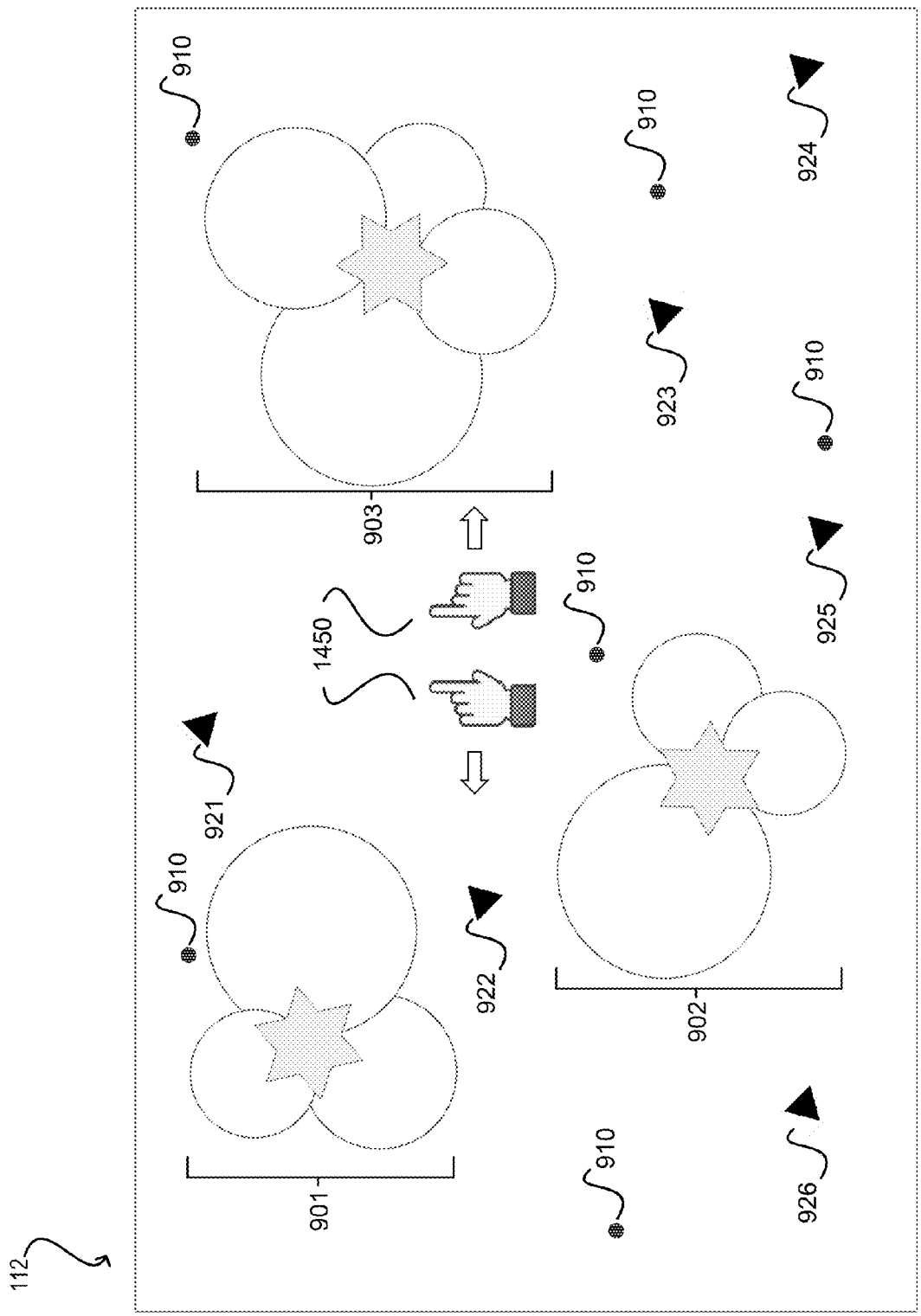
FIG. 14 illustrates touch display 112 according to one embodiment.

FIG. 14 illustrates touch display 112 according to one embodiment. Touch display 112 in FIG. 14 includes the same elements that are in touch display 112 of FIG. 9. For instance, touch display 112 includes collection 901, collection 902, collection 903, collection 910, and a collection consisting of icons 921-926. Touch display 112 can also be configured to receive user input 1450. User input 1450 can be a physical contact detected on the touch display that comprises of two touch points that move away from one another. The physical contact can be performed using one or two hands of the user. User input 1450 can be representative of touching a location of the virtual environment that is not occupied by an icon and performing an expanding gesture. The expanding gesture consists of contacting touch display 112 in at least two points, at least one of which is unoccupied by an icon, and dragging the contacted points away from one another. In some examples, user input 1450 can representative of initiating a search feature. Here, user input 1450 is representative of two hands touching touch display 112 at one location each where the locations are unoccupied by icons and dragging the touched locations towards the edges of touch display 112.

Figure 15:
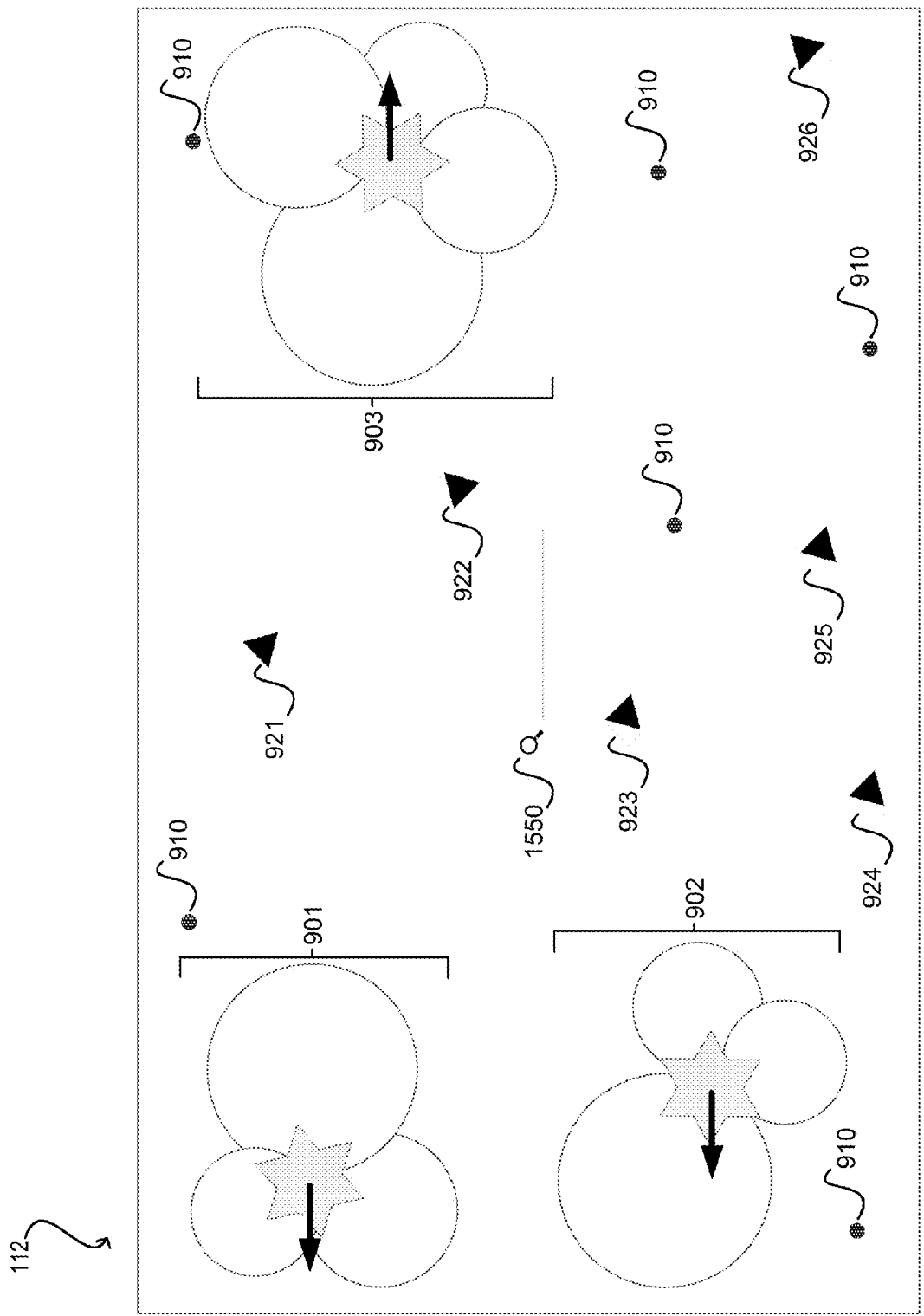
FIG. 15 illustrates touch display 112 according to another embodiment.

FIG. 15 illustrates touch display 112 according to another embodiment. Here, processor 114 has received user input initiating a search feature and processes the virtual environment presented on touch display 112 in preparation for the search. In one embodiment, processor 114 can move collections of performance metrics towards the edges of the virtual environment in preparation for the search. In one example, collections 901, 902 and 903 can be moved towards the nearest edge of the virtual environment. In another example, one or more edges of the virtual environment can be specified as edges which collections representing performance metrics can migrate towards. For instance, collections 901, 902, and 903 can move towards the left and right edge of the virtual environment when the left and right edge of the virtual environment are specified as migrating edges. Alternatively, collections 901, 902, and 903 can all move towards the top edge of the virtual environment when the top edge of the virtual environment is specified as the migrating edge. In some examples, processor 114 can continue to move collections 901, 902, and 903 until they are no longer visible in touch display 112.

In one embodiment, processor 114 can present search bar 1550 at a predefined location in the virtual environment. In some examples, processor 114 can move icons located at the predefined location to a location other than the predefined location when search bar 1550 is presented. For example, icon 922 can be moved away from the predefined location when search bar 1550 is presented. In some examples, processor 114 can expose search bar 1550 and remove collections of performance metrics from the virtual environment at the same time. What remains in the virtual environment are icons from supplemental collections (e.g., collection 910 and the collection consisting of icons 921-926) and search bar 1550.

Figure 16:
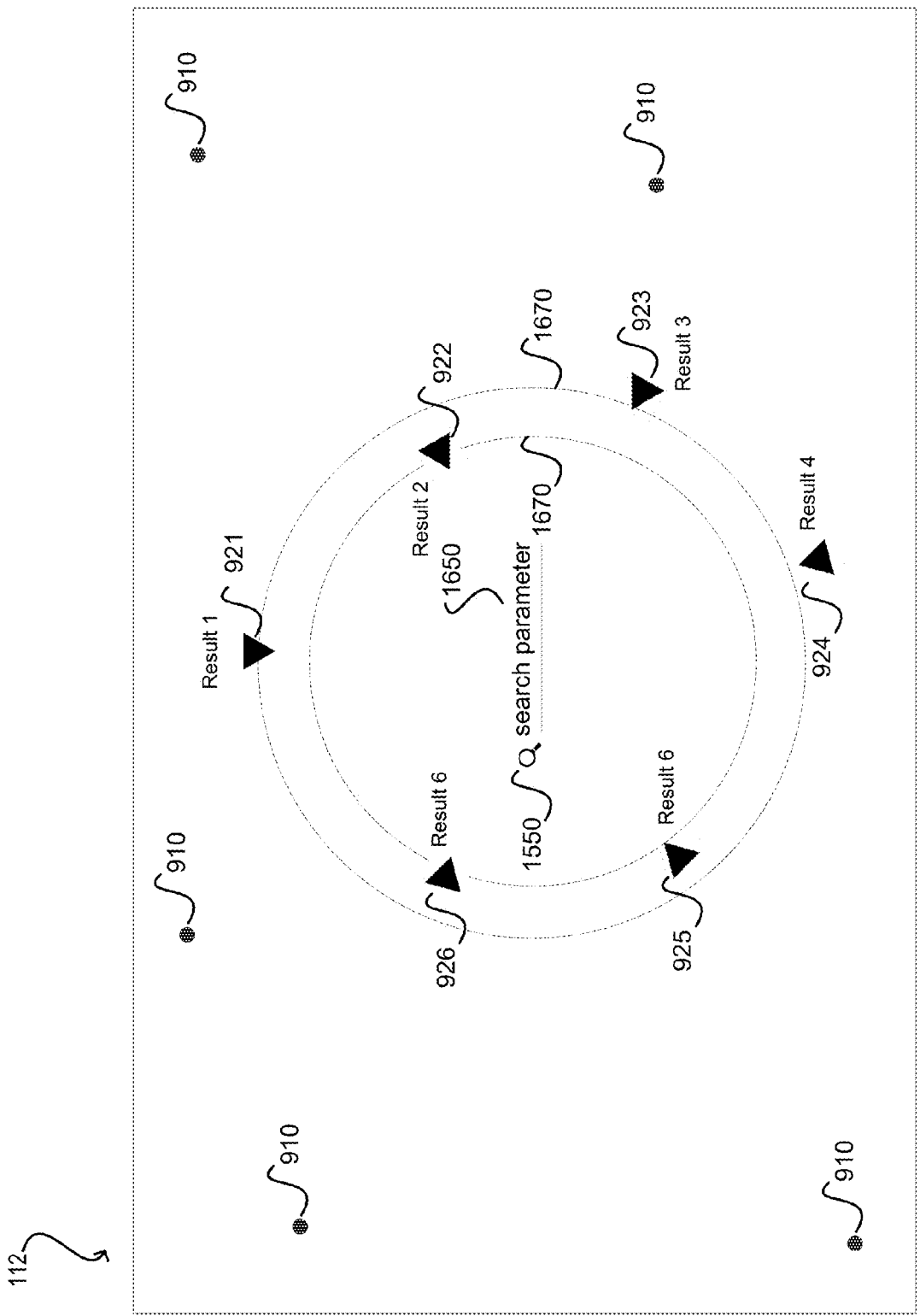
FIG. 16 illustrates touch display 112 according to another embodiment.

FIG. 16 illustrates touch display 112 according to another embodiment. Here, search parameter 1650 has been received in search bar 1550. Search parameter 1650 can be one or more keywords used to search one or more databases. User input representative of entering search parameter 1650 can be received on touch display 112 or another input device, such as a keyboard. Upon receiving search parameter 1650, processor 114 can perform a search based on keyword 1650 to return one or more search results. In some examples, one or more databases accessible to tabletop device 110 can be searched for search results.

In one embodiment, processor 114 can assign each search result to an icon from a supplemental collection of icons. This allows the search results to be visually represented by their corresponding icon. In some examples, processor 921 can position the supplemental collection of icons around search bar 1550 where the proximity of an icon to search bar 1550 represents the relevance of the search result that corresponds to the icon. Here, the search results that correspond to icons 922 and 926 are more relevant than the search results that correspond to icons 921 and 924 since icons 922 and 926 are in closer proximity to search bar 1550.

In one embodiment, processor 114 can alter the visual appearance of the icons from the supplemental collection to visually represent additional details related to the search results. Visual appearance modifiers can include modifying the type of icon, size of icon, shape of icon, and color of icon. For example, a color of an icon can indicate the source of the search result. As another example, the size of an icon can indicate the relevance of the search result to the given user. In the specific example of icons that resemble koi fish, the classification of the koi fish, the color of the koi fish, and the size of the koi fish can all be used to visually represent additional information to the user. Larger koi fish may appear closer to the top of the pond while smaller koi fish may appear further below. In some examples, the relevance of a search result to a particular user can determine the size of the icon corresponding to the search result. This allows results that are relevant to a particular user account to be larger in size. Thus, a search result that is very relevant to the search parameters can be represented by an icon that is close to the search query. If the search result is not very relevant to the user account, then the icon representing the search result can be small in size, thus drawing less attention to the search result.

In one embodiment, processor 114 can display additional details on a search result when the icon corresponding to the search result is selected. For example, processor 114 can present additional details relating to result 1 on touch display 112 when a user input representative of selecting icon 921 is detected. Some of the additional details may be the same additional details that are used to alter the visual appearance of the icon.

In one embodiment, processor 114 can update the search results when keywords are added or removed from search parameter 1650. Icons corresponding to search results that are no longer part of the updated search results may slowly disappear from the virtual environment while icons corresponding to search results that become more relevant in the updated search results may move closer to search bar 1550. In the pond example, an icon corresponding to a search result that is no longer in the updated search results can slowly disappear by becoming smaller in size as though the icon is moving into the depths of the pond. Alternatively, an icon corresponding to a search result that is no longer in the updated search results can move away from search bar 1550 until it is no longer in the virtual environment. In some examples, the visual appearance of an icon can also be modified in response to updated search results. For instance, the size of the icon can be modified to illustrate the relevance of the updated search parameter to the search result corresponding to the icon.

In some examples where the virtual environment is a pond and icons 921-926 resemble koi fish, processor 114 can provide an animation of fish food entering the pond when keyword 1650 is received. The fish food can enter the pond at or near search bar 1550. Processor 114 can also provide ripples 1670 when the fish food enters the pond. The ripples can assist the user in visually determining which fish icon is closer to search bar 1550. Fish icons closer to search bar 1550 are associated with a search result that is more relevant to the search parameter. After processor 114 provides the animation of fish food entering the pond, processor 114 can converge fish icons 921-926 toward search bar 1550. As a fish icon converges to search bar 1550, the fish icon may stop at a point that is representative of the relevance of the corresponding search result. This can allow a user to visually identify the relevance of a search result to keyword 1650. A title can accompany each icon to provide some information about the corresponding search result.

Figure 17:
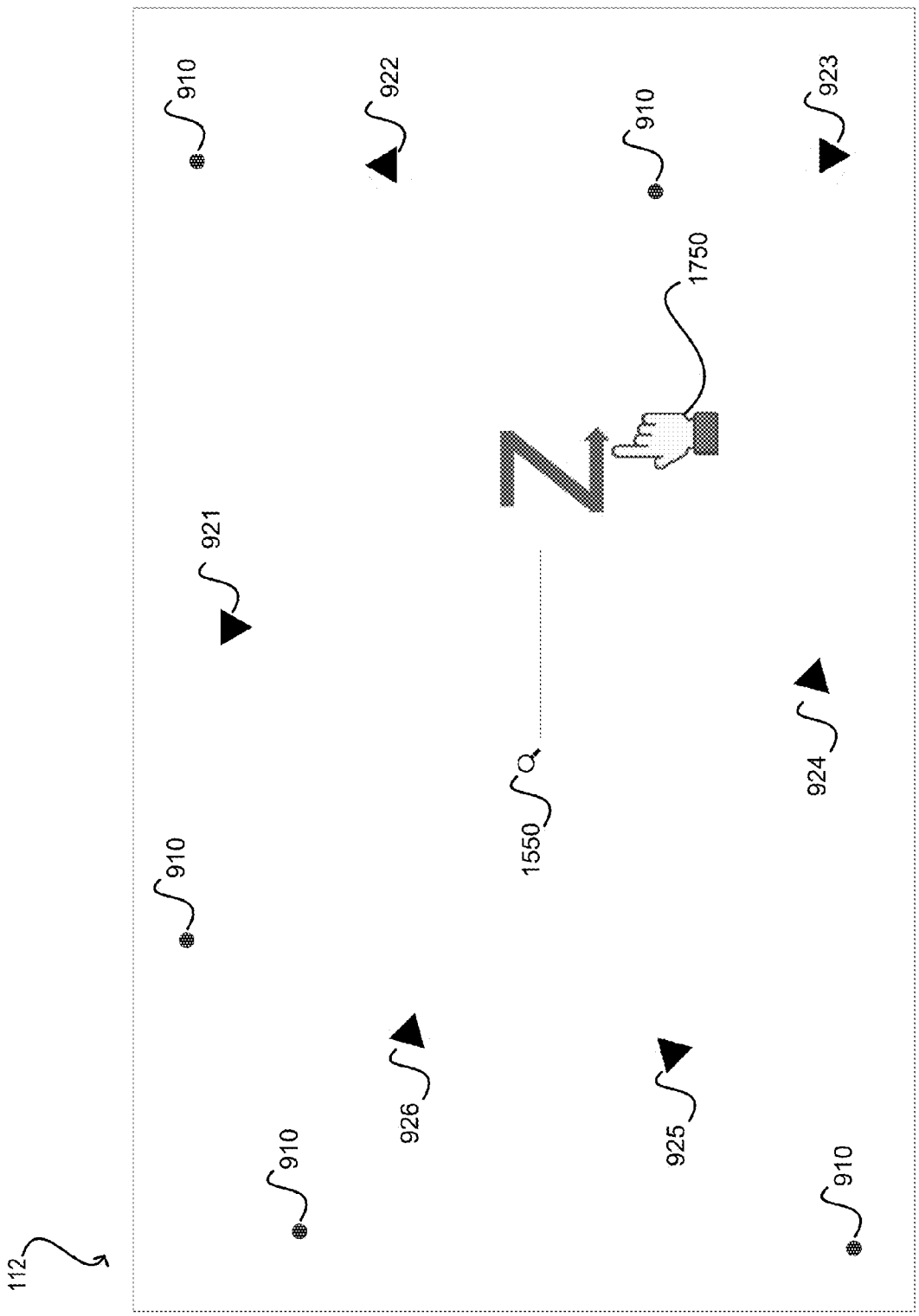
FIG. 17 illustrates touch display 112 according to another embodiment.

FIG. 17 illustrates touch display 112 according to another embodiment. Here, user input 1750 has been received that is representative of clearing a search as described above in FIG. 16. When processor 114 detects user input 1750, processor 114 can return the virtual environment to the state shown in FIG. 15. Here, the user input is a zig-zag motion that resembles a disturbance in the virtual environment. When the user input is detected, the icons from the supplemental collection can scatter in the virtual environment and search bar 1550 can be cleared, ready to receive a new search parameter. In the koi fish example, koi fish icons can move away from user input 1750 resembling fish that are swimming away from a hand in the pond. In other words, the koi fish icons will not converge on search bar 1550 resembling fish that are moving towards food.

Figure 18:
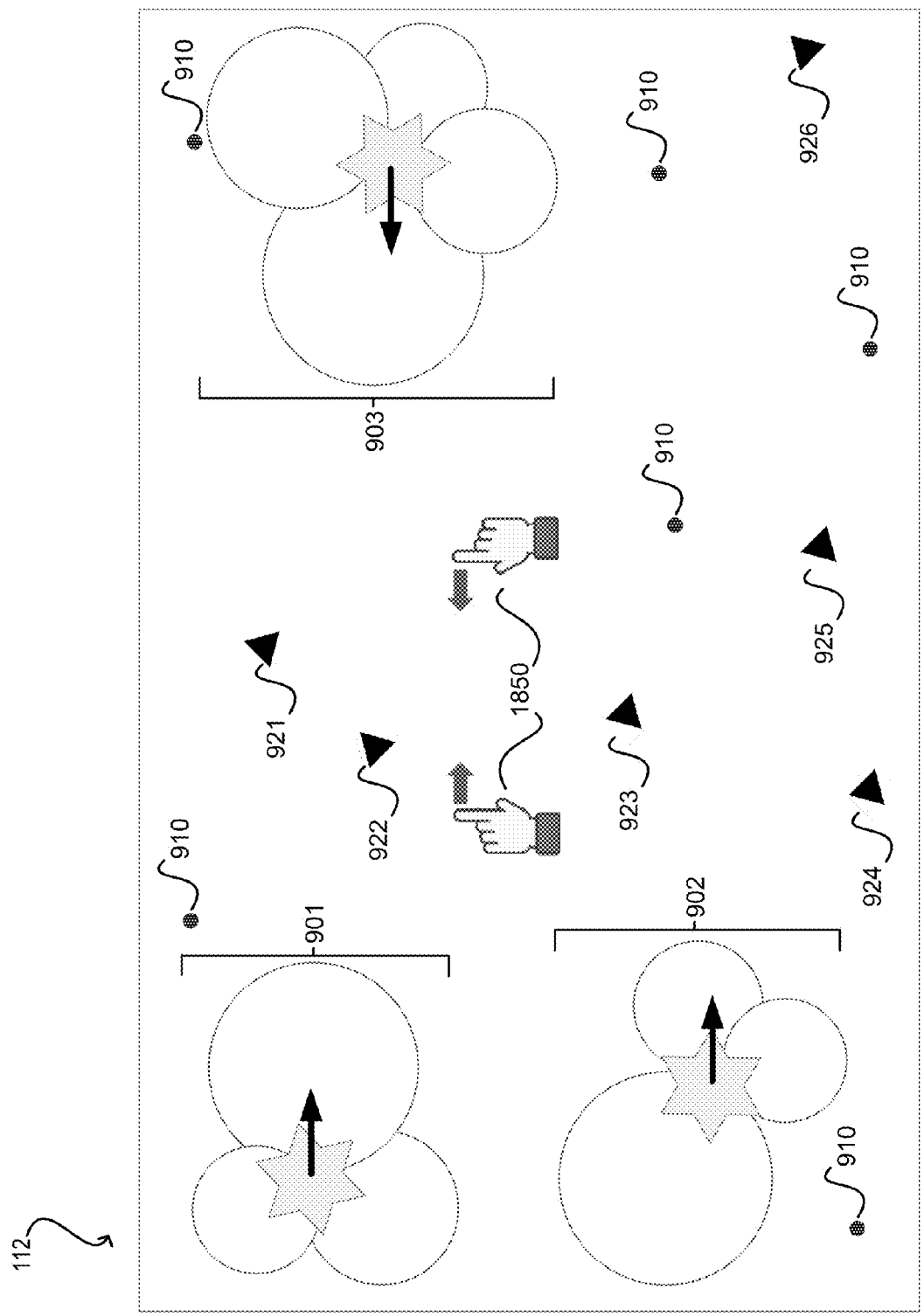
FIG. 18 illustrates touch display 112 according to another embodiment.

FIG. 18 illustrates touch display 112 according to another embodiment. Here, user input 1850 has been received that is representative of closing a search feature as described above in FIGS. 14-17. In one example, user input 1850 can be a gesture that is the opposite of gesture 1450 used to initiate the search feature. In another example, user input 1850 can be a pinching gesture comprising detecting two or more points touching touch display 112 where the touched points move towards one another. Processor 114 can reintroduce collections 901, 902, and 903 containing performance metrics back into the virtual environment when user input 1850 is detected. Processor 114 can also remove search bar 1550 from the virtual environment. Once the search feature is closed, the virtual environment can appear similar to the virtual environment shown in FIG. 9.

Figure 19:
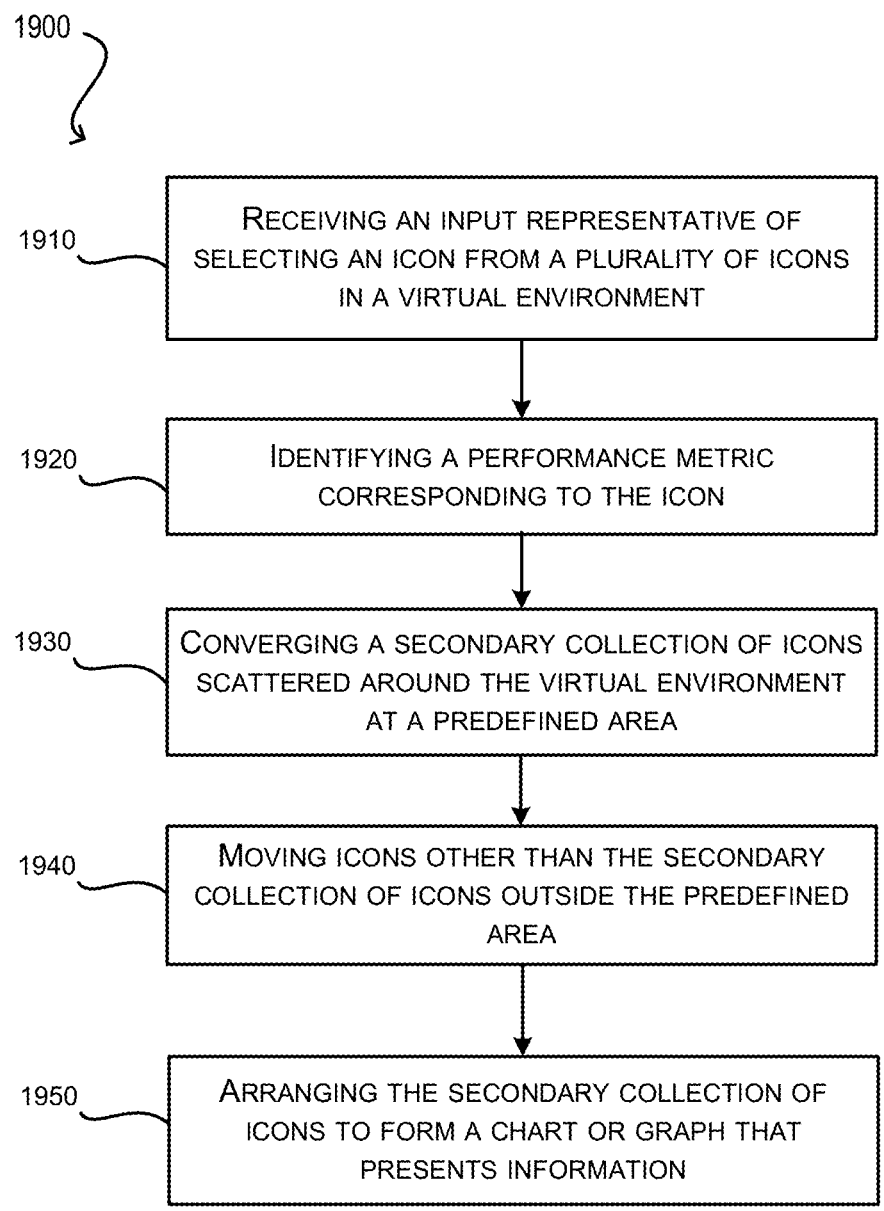
FIG. 19 illustrates a process flow for presenting information associated with a performance metric according to one embodiment.

FIG. 19 illustrates a process flow for presenting information associated with a performance metric according to one embodiment. Process 1900 can be stored in computer readable medium and executed by a processor such as processor 114 in FIG. 1. Process 1900 begins by receiving an input representative of selecting an icon from a plurality of icons in a virtual environment at 1910. The icon can be an icon a lily pad icon that represents a performance metric and the virtual environment can be a pond. Process 1900 then continues by identifying the performance metric corresponding to the icon at 1920. Once the performance metric is identified, process 1900 continues by converting a supplemental collection of icons scattered around the virtual environment at a predefined area at 1930. The supplemental collection of icons can be icons that are configured for displaying information related to performance metrics. In some examples, the supplemental collection of icons can be firefly icons. Process 1900 also moves icons other than the supplemental collection of icons outside the predefined area at 1940. This can include moving the plurality of icons that represent performance metrics towards edges of the virtual environment. At 1950, process 1900 can arrange the supplemental collection of icons to form a chart or graph that presents information related to the performance metric corresponding to the selected icon. The supplemental collection of icons can form a bar chart, line graph, pie chart, and others.

Figure 20:
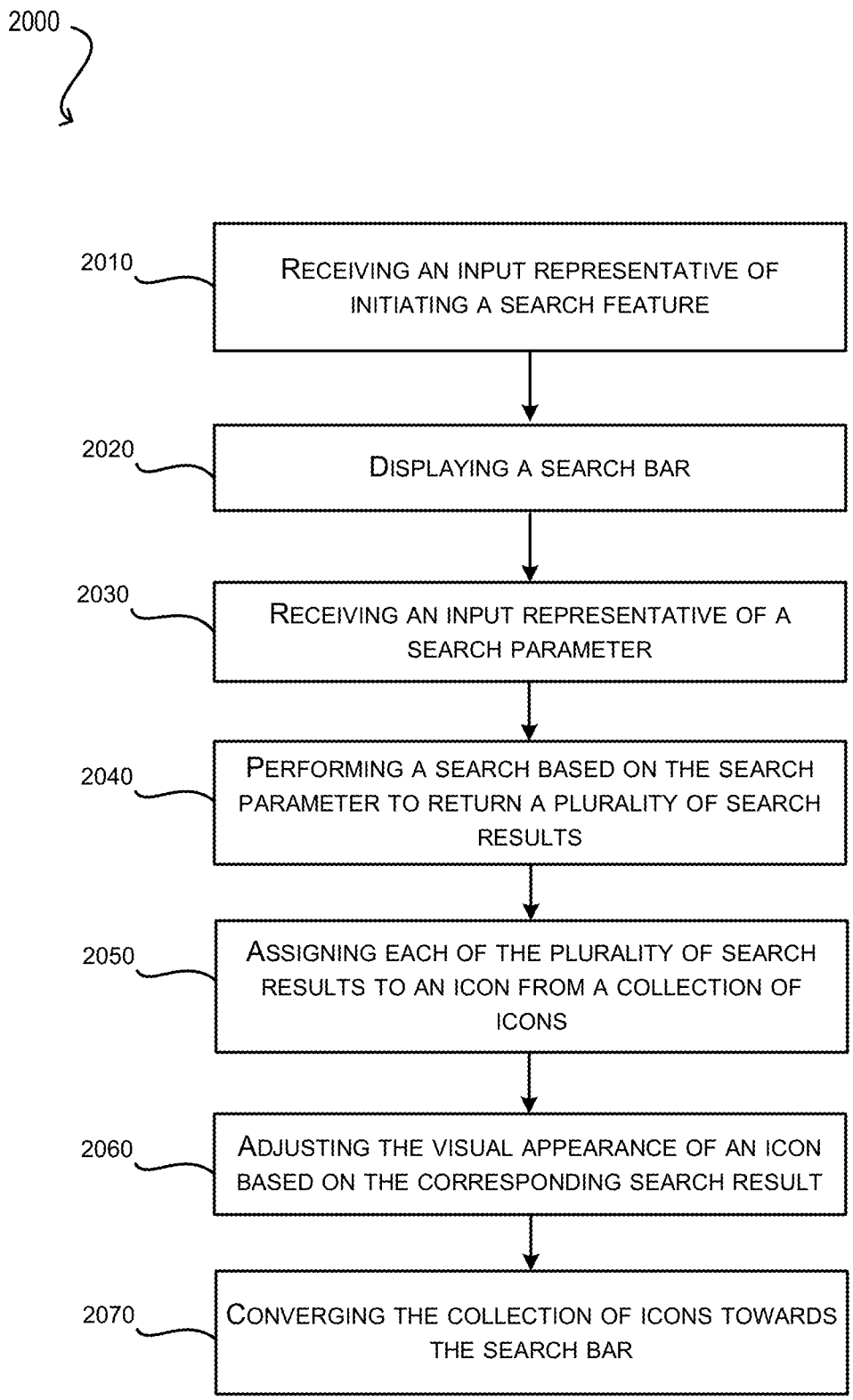
FIG. 20 illustrates a process flow for performing a search function according to one embodiment.

FIG. 20 illustrates a process flow for performing a search function according to one embodiment. Process 2000 can be stored in computer readable medium and executed by a processor such as processor 114 in FIG. 1. Process 2000 begins by receiving an input representative of initiating a search feature at 2010. The input can be an expand gesture consisting of at least two touch points moving away from one another. Upon receiving the input, process 2000 displays a search bar at 2020. The search bar can be displayed at a predefined location in the virtual environment where icons that are at the predefined location can be moved to some other location in the virtual environment. Process 2000 then continues by receiving an input representative of a search parameter. The search parameter can be received from a touch display or from a keyboard and can include one or more keywords. At 2040, process 2000 performs a search based on the search parameter to return a plurality of search results. Once the search results are determined, process 2000 can assign each of the plurality of search results to an icon from a collection of icons at 2050. The assignment can be random or can be based on a predefined algorithm. In some examples, the collection of icons can be fish in a pond. Once the search results have been assigned to icons, process 2000 can adjust the visual appearance of an icon based on the corresponding search result at 2060. Examples of visual appearance adjustments can include the size, shape, and color of the icon. In some examples, the visual appearance of an icon can be adjusted to convey additional information about the search result that corresponds to the icon. For example, the icon can be made a large size if the search result is more relevant to a particular user account. Larger icons can be more prominent and thus attract more attention from the user. In the fish example, larger fish can appear as though they are in shallower water while smaller fish can appear as though they are in deeper water. At 2070, process 2000 can converge the collection of icons towards the search bar. The proximity of a given icon to the search bar can be dependent on the relevance of the corresponding search result to the search parameter.

Figure 21:
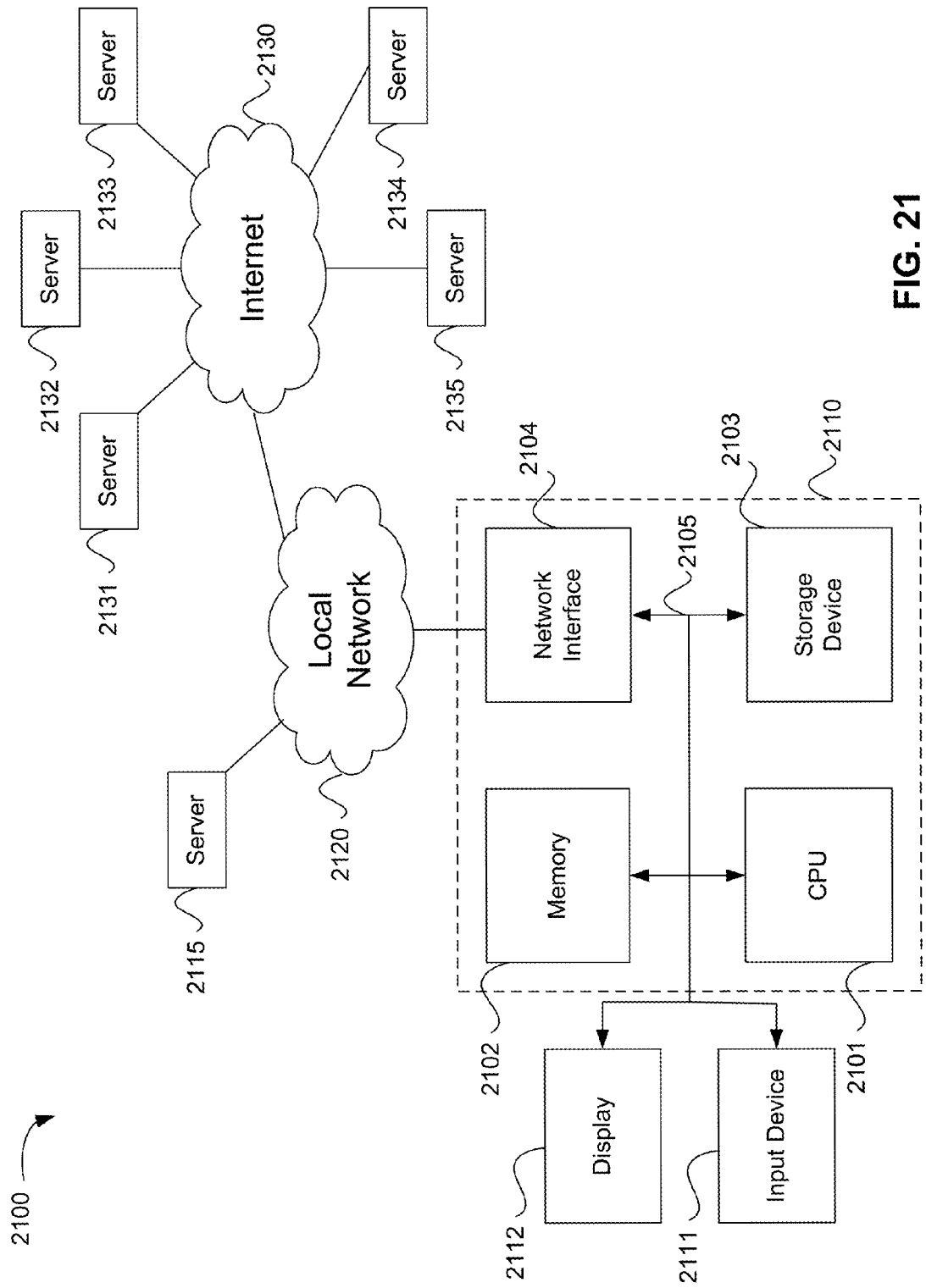
FIG. 21 illustrates an exemplary computer system according to one embodiment.

An exemplary computer system 2100 is illustrated in FIG. 21. Computer system 2110 includes bus 2105 or other communication mechanism for communicating information, and a processor 2101 coupled with bus 2105 for processing information. Computer system 2110 also includes a memory 2102 coupled to bus 2105 for storing information and instructions to be executed by processor 2101, including information and instructions for performing the techniques described above, for example. This memory may also be used for storing variables or other intermediate information during execution of instructions to be executed by processor 2101. Possible implementations of this memory may be, but are not limited to, random access memory (RAM), read only memory (ROM), or both. A storage device 2103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2103 may include source code, binary code, or software files for performing the techniques above, for example. Storage device and memory are both examples of computer readable mediums.

Computer system 2110 may be coupled via bus 2105 to a display 2112, such as a cathode ray tube (CRT) or liquid crystal display (LCD), for displaying information to a computer user. An input device 2111 such as a keyboard and/or mouse is coupled to bus 2105 for communicating information and command selections from the user to processor 2101. The combination of these components allows the user to communicate with the system. In some systems, bus 2105 may be divided into multiple specialized buses.

Computer system 2110 also includes a network interface 2104 coupled with bus 2105. Network interface 2104 may provide two-way data communication between computer system 2110 and the local network 2120. The network interface 2104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 2110 can send and receive information, including messages or other interface actions, through the network interface 2104 across a local network 2120, an Intranet, or the Internet 2130. For a local network, computer system 2110 may communicate with a plurality of other computer machines, such as server 2115. Accordingly, computer system 2110 and server computer systems represented by server 2115 may form a cloud computing network, which may be programmed with processes described herein. In the Internet example, software components or services may reside on multiple different computer systems 2110 or servers 2131-2135 across the network. The processes described above may be implemented on one or more servers, for example. A server 2131 may transmit actions or messages from one component, through Internet 2130, local network 2120, and network interface 2104 to a component on computer system 2110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method for presenting a collection of data, comprising:

providing, by a processor, a virtual environment having a visual appearance corresponding to a scene from nature;

processing the collection of data from at least one chart in a database table;

presenting, by the processor, a first collection of icons within the virtual environment that represent the collection of data, the first collection of icons including a plurality of icons that represent a plurality of performance metrics derived from the collection of data and a group icon, wherein the plurality of icons cluster around the group icon to provide a visual indication that the plurality of icons are generated from the collection of data in the chart in the database table;

displaying a search bar to receive a search input;

receiving a search parameter input to the search bar;

performing a search based on the search parameter to return a plurality of search results;

representing each of the plurality of search results as an icon from a second collection of icons, wherein the proximity of each of the second collection of icons to the search bar in the virtual environment is based on the relevance of the corresponding search result to the search parameter input to the search bar, and wherein the second collection of icons are displayed in the virtual environment in concentric regions surrounding the search bar, and icons of the second collection of icons corresponding to search results more relevant to the search parameter are displayed in concentric regions of the virtual environment having smaller circumferences and icons of the second collection of icons corresponding to search results less relevant to the search parameter are displayed in concentric regions of the virtual environment having larger circumferences;

receiving an updated search parameter input to the search bar; and modifying the location of each of the second collection of icons in the virtual environment based on the updated search parameter, wherein icons of the second collection of icons corresponding to search results more relevant to the search parameter migrate closer to the search bar in the virtual environment and icons of the second collection of icons corresponding to the search results less relevant to the search parameter migrate away from the search bar in the virtual environment, wherein the migration comprises an animation wherein the corresponding icons of the second collection of icons move in a manner corresponding to a creature within the scene from nature.

2. The computer-implemented method of claim 1, further comprising:

receiving, by the processor, a first input representative of selecting an icon from the plurality of icons;

displaying, by the processor, information associated with a performance metric corresponding to the selected icon in response to the first input.

3. The computer-implemented method of claim 2, further comprising:

providing, by the processor, a spotlight on the selected icon; and dimming, by the processor, the remainder of the virtual environment.

4. The computer-implemented method of claim 2, wherein displaying information associated with the performance metric comprises:

converging, by the processor, a third collection of icons scattered around the virtual environment at a predefined area in the virtual environment;

moving, by the processor, icons other than the third collection of icons outside the predefined area in the virtual environment; and arranging, by the processor, the third collection of icons to form a chart or graph that presents the information associated with the performance metric.

5. The computer-implemented method of claim 1, further comprising:

providing, by the processor, the second collection of icons scattered around the virtual environment;

receiving, by the processor, a first input representative of initiating a search feature;

moving, by the processor, the first collection of icons towards at least one edge of the virtual environment until the first collection of icons are no longer in the virtual environment in response to the first input; and displaying, by the processor; a search bar.

6. The computer-implemented method of claim 1, further comprising:

modifying the size of each of the second collection of icons in the virtual environment based on the updated search parameter input to the search bar, wherein icons of the second collection of icons corresponding to search results more relevant to the search parameter increase in size in the virtual environment and icons of the second collection of icons corresponding to search results less relevant to the search parameter decrease in size in the virtual environment.

7. The computer-implemented method of claim 6, wherein the visual appearance of the icon is dependent on the relevance of the corresponding search result to a user account.

8. A non-transitory computer readable storage medium storing one or more programs, the one or more programs comprising instructions for:

providing a virtual environment having a visual appearance corresponding to a scene from nature;

processing the collection of data from at least one chart in a database table;

presenting a first collection of icons within the virtual environment that represent a collection of data, the first collection of icons including a plurality of icons that represent a plurality of performance metrics derived from the collection of data and a group icon, wherein the plurality of icons cluster around the group icon to provide a visual indication that the plurality of icons are generated from the collection of data in the chart in the database table;

displaying a search bar to receive a search input;

receiving a search parameter input to the search bar;

performing a search based on the search parameter to return a plurality of search results;

representing each of the plurality of search results as an icon from a second collection of icons, wherein the proximity of each of the second collection of icons to the search bar in the virtual environment is based on the relevance of the corresponding search result to the search parameter input to the search bar, and wherein the second collection of icons are displayed in the virtual environment in concentric regions surrounding the search bar, and icons of the second collection of icons corresponding to search results more relevant to the search parameter are displayed in concentric regions of the virtual environment having smaller circumferences and icons of the second collection of icons corresponding to search results less relevant to the search parameter are displayed in concentric regions of the virtual environment having larger circumferences;

receiving an updated search parameter input to the search bar; and modifying the location of each of the second collection of icons in the virtual environment based on the updated search parameter, wherein icons of the second collection of icons corresponding to search results more relevant to the search parameter migrate closer to the search bar in the virtual environment and icons of the second collection of icons corresponding to search results less relevant to the search parameter migrate away from the search bar in the virtual environment, wherein the migration comprises an animation wherein the corresponding icons of the second collection of icons move in a manner corresponding to a creature within the scene from nature.

9. The non-transitory computer readable storage medium of claim 8, further comprising:

receiving a first input representative of selecting an icon from the plurality of icons;

displaying information associated with a performance metric corresponding to the selected icon in response to the first input.

10. The non-transitory computer readable storage medium of claim 9, further comprising:
providing a spotlight on the selected icon; and
dimming the remainder of the virtual environment.

11. The non-transitory computer readable storage medium of claim 9, wherein the virtual environment includes a third collection of icons scattered around the virtual environment and displaying information associated with the performance metric comprises:
converging the third collection of icons at a predefined area in the virtual environment;
moving icons other than the third collection of icons outside the predefined area in the virtual environment; and
arranging the third collection of icons to form a chart or graph that presents the information associated with the performance metric.

12. The non-transitory computer readable storage medium of claim 8, further comprising:
providing the second collection of icons scattered around the virtual environment;
receiving a first input representative of initiating a search feature;
moving the first collection of icons towards at least one edge of the virtual environment until the first collection of icons are no longer in the virtual environment in response to the first input; and
displaying a search bar.

13. The non-transitory computer readable storage medium of claim 8, further comprising:
modifying the size of each of the second collection of icons in the virtual environment based on the updated search parameter input to the search bar, wherein icons of the second collection of icons corresponding to search results more relevant to the search parameter increase in size in the virtual environment and icons of the second collection of icons corresponding to search results less relevant to the search parameter decrease in size in the virtual environment.

14. The non-transitory computer readable storage medium of claim 13, wherein the visual appearance of the icon is dependent on the relevance of the corresponding search result to a user account.

15. A computer-implemented system for presenting a collection of data, the system comprising:
one or more computer processors;
a non-transitory computer-readable storage medium comprising instructions, which when executed, control the one or more computer processors to be configured for:
providing a virtual environment having a visual appearance corresponding to a scene from nature;
processing the collection of data from at least one chart in a database table;
presenting a first collection of icons within the virtual environment that represent a collection of data, the first collection of icons including a plurality of icons that represent a plurality of performance metrics derived from the collection of data and a group icon,
wherein the plurality of icons cluster around the group icon to provide a visual indication that the plurality of icons are generated from the collection of data in the chart in the database table;
displaying a search bar to receive a search input;
receiving a search parameter input to the search bar;
performing a search based on the search parameter to return a plurality of search results;
representing each of the plurality of search results as an icon from a second collection of icons, wherein the proximity of each of the second collection of icons to the search bar in the virtual environment is based on the relevance of the corresponding search result to the search parameter input to the search bar, and
wherein the second collection of icons are displayed in the virtual environment in concentric regions surrounding the search bar, and icons of the second collection of icons corresponding to search results more relevant to the search parameter are displayed in concentric regions of the virtual environment having smaller circumferences and icons of the second collection of icons corresponding to search results less relevant to the search parameter are displayed in concentric regions of the virtual environment having larger circumferences;
receiving an updated search parameter input to the search bar; and
modifying the location of each of the second collection of icons in the virtual environment based on the updated search parameter, wherein icons of the second collection of icons corresponding to search results more relevant to the search parameter migrate closer to the search bar in the virtual environment and icons of the second collection of icons corresponding to search results less relevant to the search parameter migrate away from the search bar in the virtual environment, wherein the migration comprises an animation wherein the corresponding icons of the second collection of icons move in a manner corresponding to a creature within the scene from nature.

16. The computer implemented system of claim 15, further comprising:
receiving a first input representative of selecting an icon from the plurality of icons;
displaying information associated with a performance metric corresponding to the selected icon in response to the first input.

17. The computer implemented system of claim 16, wherein the virtual environment includes a third collection of icons scattered around the virtual environment and displaying information associated with the performance metric comprises:
converging the third collection of icons at a predefined area in the virtual environment;
moving icons other than the third collection of icons outside the predefined area in the virtual environment; and
arranging the third collection of icons to form a chart or graph that presents the information associated with the performance metric.

18. The computer implemented system of claim 15, further comprising:
providing the second collection of icons scattered around the virtual environment;
receiving a first input representative of initiating a search feature;
moving the first collection of icons towards at least one edge of the virtual environment until the first collection of icons are no longer in the virtual environment in response to the first input; and
displaying a search bar.

19. The computer implemented system of claim 15, further comprising:
modifying the size of each of the second collection of icons in the virtual environment based on the updated search parameter input to the search bar, wherein icons of the second collection of icons corresponding to search results more relevant to the search parameter increase in size in the virtual environment and icons of the second collection of icons corresponding to search results less relevant to the search parameter decrease in size in the virtual environment.

20. The computer implemented system of claim 19, wherein the visual appearance of the icon is dependent on the relevance of the corresponding search result to a user account.

* * * * *